United States Patent
Zhang et al.

(10) Patent No.: US 10,855,358 B2
(45) Date of Patent: Dec. 1, 2020

(54) CHANNEL STATE INFORMATION FEEDBACK METHOD, COMMUNICATIONS APPARATUS, AND SYSTEM

(71) Applicant: HUAWEI TECHNOLOGIES CO., LTD., Shenzhen (CN)

(72) Inventors: Ruiqi Zhang, Beijing (CN); Kunpeng Liu, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/931,749

(22) Filed: May 14, 2020

(65) Prior Publication Data
US 2020/0274603 A1 Aug. 27, 2020

Related U.S. Application Data

(63) Continuation of application No. PCT/CN2017/111723, filed on Nov. 17, 2017.

(51) Int. Cl.
*H04B 7/06* (2006.01)
*H04L 1/06* (2006.01)
*H04B 7/0456* (2017.01)

(52) U.S. Cl.
CPC ......... *H04B 7/0639* (2013.01); *H04B 7/0456* (2013.01); *H04B 7/0626* (2013.01); *H04L 1/06* (2013.01)

(58) Field of Classification Search
CPC .... H04B 7/0456; H04B 7/066; H04B 7/0626; H04B 7/0639; H04B 17/336; H04L 1/06
See application file for complete search history.

(56) References Cited

U.S. PATENT DOCUMENTS 8,451,932 B2 * 5/2013 Onggosanusi ....... H04B 7/0426
375/285
8,451,944 B2 * 5/2013 Gaur .................... H04B 7/0452
375/296

(Continued)

FOREIGN PATENT DOCUMENTS

CN 101400074 A 4/2009
CN 102111246 A 6/2011

(Continued)

OTHER PUBLICATIONS

3GPP TSG-RAN WG1 #89ah-NR,R1-1711035:"Frequency parametrization for Type II CSI feedback", Ericsson, Qingdao, China, Jun. 27, 2017,total 7 pages.

(Continued)

*Primary Examiner* — James M Perez
(74) *Attorney, Agent, or Firm* — Rimon PC

(57) ABSTRACT

This application provides a channel state information feedback method and an apparatus. The method includes: generating first frequency domain indication information and $M_1$ pieces of first precoding indication information, where the first frequency domain indication information is used to indicate $L_1$ frequency domain subbands in T frequency domain subbands, the T frequency domain subbands are a system bandwidth or a part of the system bandwidth, $1 \leq L_1 < T$, the T frequency domain subbands are in a one-to-one correspondence with T precoding matrices, and a precoding matrix $w^k$ corresponding to a $k^{th}$ frequency domain subband satisfies: $W^k = W_1 \times W_2^k$, where $w_1$ represents a matrix with $N_t$ rows and R columns, and $W_2^k$ represents a matrix with R rows and S columns; and $w_1$ represents a matrix with $N_t$ rows and R columns, and $W_2^k$ represents a matrix with R rows and S columns.

20 Claims, 5 Drawing Sheets

(56) References Cited

U.S. PATENT DOCUMENTS

| | | | | |
|---|---|---|---|---|
| 8,457,265 | B2 * | 6/2013 | Sampath | H04L 25/03006 375/350 |
| 8,548,088 | B2 * | 10/2013 | Lee | H04L 25/03343 375/285 |
| 8,699,607 | B2 * | 4/2014 | Seller | H04L 27/2649 375/267 |
| 8,718,204 | B1 * | 5/2014 | Lee | H04L 25/03331 375/341 |
| 9,042,480 | B2 * | 5/2015 | Onggosanusi | H04B 7/0456 375/285 |
| 9,350,435 | B2 * | 5/2016 | Zhang | H04B 7/0417 |
| 9,577,724 | B2 * | 2/2017 | Zhang | H04B 1/0475 |
| 9,742,477 | B2 * | 8/2017 | Wu | H04B 7/0885 |
| 9,906,279 | B2 * | 2/2018 | Zhang | H04B 7/0639 |
| 10,056,950 | B2 * | 8/2018 | Wu | H04W 88/08 |
| 10,158,404 | B2 * | 12/2018 | Wu | H04B 7/0456 |
| 10,419,090 | B2 * | 9/2019 | Zhang | H04B 7/0478 |
| 10,454,546 | B2 * | 10/2019 | Zhang | H04B 7/0658 |
| 10,498,423 | B2 * | 12/2019 | Wu | H04B 7/0417 |
| 10,505,694 | B2 * | 12/2019 | Liu | H04W 24/10 |
| 10,530,450 | B2 * | 1/2020 | Ren | H04B 7/06 |
| 10,680,697 | B2 * | 6/2020 | Wu | H04B 7/0634 |
| 10,727,916 | B2 * | 7/2020 | Liu | H04B 7/0634 |
| 2008/0043677 | A1 * | 2/2008 | Kim | H04B 7/0634 370/332 |
| 2009/0046569 | A1 | 2/2009 | Chen et al. | |
| 2009/0154588 | A1 * | 6/2009 | Chen | H04L 1/0026 375/267 |
| 2010/0035555 | A1 * | 2/2010 | Bala | H04B 7/06 455/63.1 |
| 2010/0151795 | A1 * | 6/2010 | Lee | H04B 7/0639 455/69 |
| 2011/0216846 | A1 * | 9/2011 | Lee, II | H04B 7/0478 375/295 |
| 2011/0243079 | A1 * | 10/2011 | Chen | H04B 7/0639 370/329 |
| 2012/0219042 | A1 * | 8/2012 | Onggosanusi | H04L 25/03923 375/219 |
| 2012/0257664 | A1 * | 10/2012 | Yue | H04L 1/0035 375/227 |
| 2012/0269290 | A1 * | 10/2012 | Onggosanusi | H04L 25/03343 375/296 |
| 2012/0275386 | A1 * | 11/2012 | Frenne | H04B 7/10 370/328 |
| 2012/0287799 | A1 * | 11/2012 | Chen | H04B 7/0626 370/252 |
| 2013/0039349 | A1 * | 2/2013 | Ebrahimi Tazeh Mahalleh | H04B 7/024 370/336 |
| 2013/0094464 | A1 * | 4/2013 | Li | H04W 72/0413 370/329 |
| 2013/0136065 | A1 * | 5/2013 | Chen | H04L 25/03923 370/329 |
| 2013/0195035 | A1 * | 8/2013 | Taoka | H04L 25/03898 370/329 |
| 2013/0308542 | A1 * | 11/2013 | Kang | H04B 7/066 370/328 |
| 2013/0315337 | A1 * | 11/2013 | Dai | H04L 5/0057 375/267 |
| 2016/0182137 | A1 * | 6/2016 | Onggosanusi | H04B 7/0469 370/329 |
| 2016/0380734 | A1 * | 12/2016 | Wang | H04L 5/0057 370/329 |
| 2017/0047978 | A1 * | 2/2017 | Kim | H04B 7/0626 |
| 2017/0099093 | A1 * | 4/2017 | Zhang | H04B 7/0626 |
| 2018/0254816 | A1 * | 9/2018 | Liu | H04B 7/0626 |
| 2018/0302140 | A1 * | 10/2018 | Rahman | H04B 7/0639 |
| 2018/0309486 | A1 * | 10/2018 | Zhang | H04B 7/0486 |
| 2019/0036580 | A1 * | 1/2019 | Zhang | H04B 7/0658 |
| 2019/0036581 | A1 * | 1/2019 | Zhang | H04B 7/0639 |
| 2019/0081670 | A1 * | 3/2019 | Liu | H04B 7/0634 |
| 2019/0149206 | A1 * | 5/2019 | Zhang | H04L 1/06 375/267 |
| 2019/0173607 | A1 * | 6/2019 | Liu | H04L 5/0094 |
| 2019/0222275 | A1 * | 7/2019 | Mo | H04B 7/0482 |
| 2019/0229786 | A1 * | 7/2019 | Huang | H04B 7/0478 |
| 2019/0260459 | A1 * | 8/2019 | Jeon | H04B 7/0491 |
| 2019/0319689 | A1 * | 10/2019 | Wu | H04L 5/0053 |
| 2019/0326974 | A1 * | 10/2019 | Li | H04B 7/0478 |
| 2019/0372641 | A1 * | 12/2019 | Muruganathan | H04B 7/0617 |
| 2020/0028554 | A1 * | 1/2020 | Zhang | H04B 7/0478 |
| 2020/0212966 | A1 * | 7/2020 | Zhang | H04B 7/06 |

FOREIGN PATENT DOCUMENTS

| | | |
|---|---|---|
| CN | 102291199 A | 12/2011 |
| CN | 102291222 A | 12/2011 |

OTHER PUBLICATIONS

Catt, Evaluation results for further enhanced DL MIMO. 3GPP TSG RAN WG1 Meeting #71 New Orleans, USA, Nov. 12, 2012, R1-124770, 5 pages.

* cited by examiner

CHANNEL STATE INFORMATION FEEDBACK METHOD, COMMUNICATIONS APPARATUS, AND SYSTEM

CROSS-REFERENCE TO RELATED APPLICATIONS

This application is a continuation of International Application No. PCT/CN2017/111723, filed on Nov. 17, 2017, the disclosure of which is hereby incorporated by reference in its entirety.

TECHNICAL FIELD

This application relates to communications technologies, and in particular, to a channel state feedback method, a communications apparatus, and a system.

BACKGROUND

A long term evolution (LTE) technology and a new radio (NR) technology use a multiple-input multiple-output (MIMO) technology. If a base station may obtain a part or all of downlink channel information, the base station may use a precoding technology to improve signal transmission quality or a signal transmission rate. In a time division multiplexing (TDD) system, there is reciprocity between uplink and downlink radio channels, a downlink precoding weighting matrix can be estimated based on the uplink channel. However, in a frequency division multiplexing (FDD) system, because an uplink carrier frequency is different from a downlink carrier frequency, an uplink channel cannot be used to obtain a downlink weighting matrix. In an LTE FDD system, a precoding weighting matrix is usually obtained by feeding back a precoding indicator by a terminal user.

If a structure of a high-precision codebook is introduced in a MIMO system, a terminal device needs to feed back a large quantity of bits of a precoding matrix indicator (PMI). Consequently, feedback overheads of the terminal device are increased, and resource utilization is reduced.

SUMMARY

This application describes a channel state information sending method, a communications apparatus, and a system.

According to a first aspect, an embodiment of this application provides a channel state information sending method, where the method may be performed by a terminal device or a chip in a terminal device, and the method includes:

generating first frequency domain indication information and $M_1$ pieces of first precoding indication information, where the first frequency domain indication information is used to indicate $L_1$ frequency domain subbands in T frequency domain subbands, the T frequency domain subbands are a system bandwidth or a part of the system bandwidth, $1 \leq L_1 < T$, the T frequency domain subbands are in a one-to-one correspondence with T precoding matrices, and a precoding matrix $W^k$ corresponding to a $k^{th}$ frequency domain subband satisfies:

$$W^k = W_1 \times W_2^k, \text{ where}$$

$W_1$ represents a matrix with $N_t$ rows and R columns, and $W_2^k$ represents a matrix with R rows and S columns; and the first frequency domain indication information and the M1 pieces of first precoding indication information are used to determine T first elements, a kth first element in the T first elements is a factor of an element in an $r^{th}$ row and an $s^{th}$ column of $W_2^k$, and $1 < M_1 < T$; and sending the first frequency domain indication information and the $M_1$ pieces of first precoding indication information.

Because not all T pieces of precoding indication information need to be sent, feedback overheads are reduced.

In an example, the method further includes: generating $M_1$ pieces of second precoding indication information, where the first frequency domain indication information and the $M_1$ pieces of second precoding indication information are used to determine T second elements, a $k^{th}$ second element in the T second elements is a factor of an element in a $p^{th}$ row and a $q^{th}$ column of $W_2^k$, R=2I, $1 \leq r \leq I$, I is a positive integer, and p=r+I; and sending the $M_1$ pieces of second precoding indication information. For example, elements in the $r^{th}$ row and the $(r+I)^{th}$ row of $W_2^k$ are applied to antennas in different polarization directions at a same location of an antenna array. The factor of the element in the $r^{th}$ row and the $s^{th}$ column of $W_2^k$ and the factor of the element in the $(r+I)^{th}$ row and the $q^{th}$ column of $W_2^k$ change with relatively close regularity in frequency domain. Therefore, the first frequency domain indication information is used to indicate frequency domain positions corresponding to the factor of the element in the $r^{th}$ row and the $s^{th}$ column of $W_2^k$ and the factor of the element in the $(r+I)^{th}$ row and the $q^{th}$ column of $W_2^k$, so that feedback overheads can be reduced.

In an example, the method further includes: generating second frequency domain indication information and $M_2$ pieces of third precoding indication information, where the second frequency domain indication information is used to indicate $L_2$ frequency domain subbands in the T frequency domain subbands, and $L_2 < T$; and the second frequency domain indication information and the $M_2$ pieces of third precoding indication information are used to determine T third elements, a $k^{th}$ third element in the T third elements is a factor of an element in a $u^{th}$ row and a $v^{th}$ column of $W_2^k$, and $1 < M_2 < T$, where u is not equal to r, or v is not equal to s; and sending the second frequency domain indication information and the $M_2$ pieces of third precoding indication information.

Factors of elements at different locations of $W_2^k$ have different frequency domain indication, so that feedback precision can be improved.

In an example, the method further includes: generating $M_1$ pieces of fourth precoding indication information, where $S \geq 2$, the first frequency domain indication information and the $M_1$ pieces of fourth precoding indication information are used to determine T fourth elements, a $k^{th}$ fourth element in the T fourth elements is a factor of an element in the $r^{th}$ row and a $t^{th}$ column of $W_2^k$, and t is not equal to s; and sending the $M_1$ pieces of fourth precoding indication information.

In an example, the method further includes: determining $M_1$ frequency domain subbands in the T frequency domain subbands, where the $M_1$ frequency domain subbands include the $L_1$ frequency domain subbands, and $L_1 \leq M_1$;

determining $M_1$ first elements that are in a one-to-one correspondence with the $M_1$ frequency domain subbands, where the T first elements include the $M_1$ first elements, and the generating first frequency domain indication information includes:

generating the first frequency domain indication information based on the $L_1$ frequency domain subbands; and determining T−M$_1$ first elements in the T first elements except the M$_1$ first elements in an interpolation manner based on the M$_1$ frequency domain subbands and the M$_1$ first elements.

According to a second aspect, this application further provides a channel state information receiving method, where the method may be performed by an access network device or a chip in an access network device, and the method includes:

receiving first frequency domain indication information and M$_1$ pieces of precoding indication information, where the first frequency domain indication information is used to indicate L$_1$ frequency domain subbands in T frequency domain subbands, the T frequency domain subbands are a system bandwidth or a part of the system bandwidth, $1 \leq L_1 < T$, the T frequency domain subbands are in a one-to-one correspondence with T precoding matrices, and a precoding matrix W$^k$ corresponding to a k$^{th}$ frequency domain subband satisfies:

$$W^k = W_1 \times W_2^k, \text{ where}$$

W$_1$ represents a matrix with N$_t$ rows and R columns, and W$_2^k$ represents a matrix with R rows and S columns; and determining T first elements based on the first frequency domain indication information and the M$_1$ pieces of first precoding indication information, where a k$^{th}$ first element in the T first elements is a factor of an element in an r$^{th}$ row and an s$^{th}$ column of W$_2^k$, and $1 < M_1 < T$.

In an example, the method further includes: receiving M$_1$ pieces of second precoding indication information, and determining T second elements based on the first frequency domain indication information and the M$_1$ pieces of second precoding indication information, where a k$^{th}$ second element in the T second elements is a factor of an element in a p$^{th}$ row and a q$^{th}$ column of W$_2^k$, R=2I, $1 \leq r \leq I$, I is a positive integer, and p=r+I.

In an example, the method further includes: receiving second frequency domain indication information and M$_2$ pieces of third precoding indication information, where the second frequency domain indication information is used to indicate L$_2$ frequency domain subbands in the T frequency domain subbands, and $1 \leq L_2 < T$; and determining T third elements based on the second frequency domain indication information and the M$_2$ pieces of third precoding indication information, where a k$^{th}$ third element in the T third elements is a factor of an element in a u$^{th}$ row and a v$^{th}$ column of W$_2^k$, and $1 < M_2 < T$, where u is not equal to r, or v is not equal to s.

In an example, the method further includes: receiving M$_1$ pieces of fourth precoding indication information, and determining T fourth elements based on the first frequency domain indication information and the M$_1$ pieces of fourth precoding indication information, where $S \geq 2$, a k$^{th}$ fourth element in the T fourth elements is a factor of an element in the r$^{th}$ row and a t$^{th}$ column of W$_2^k$, and t is not equal to s.

In an example, the determining T first elements based on the first frequency domain indication information and the M$_1$ pieces of first precoding indication information includes:

determining M$_1$ frequency domain subbands in the T frequency domain subbands based on the first frequency domain indication information, where the M$_1$ frequency domain subbands include the L$_1$ frequency domain subbands, and $L_1 \leq M_1$;

determining M$_1$ first elements in the T first elements based on the M$_1$ pieces of first precoding indication information, where the M$_1$ frequency domain subbands are in a one-to-one correspondence with the M$_1$ first elements; and determining T−M$_1$ first elements in the T first elements except the M$_1$ first elements in an interpolation manner based on the first frequency domain indication information and the M$_1$ first elements.

According to a third aspect, an embodiment of this application provides a communications apparatus, where the communications apparatus may be a communications device or a chip. The communications apparatus may implement the method according to the first aspect and has a corresponding functional unit. The functional unit may be implemented by hardware, or may be implemented by software, or may be implemented by hardware executing corresponding software. The hardware or software includes one or more modules corresponding to the foregoing functions.

The communications apparatus includes:

a processing unit, configured to generate first frequency domain indication information and M$_1$ pieces of first precoding indication information, where the first frequency domain indication information is used to indicate L$_1$ frequency domain subbands in T frequency domain subbands, the T frequency domain subbands are a system bandwidth or a part of the system bandwidth, $1 \leq L_1 < T$, the T frequency domain subbands are in a one-to-one correspondence with T precoding matrices, and a precoding matrix W$^k$ corresponding to a k$^{th}$ frequency domain subband satisfies:

$$W^k = W_1 \times W_2^k, \text{ where}$$

W$_1$ represents a matrix with N$_t$ rows and R columns, and W$_2^k$ represents a matrix with R rows and S columns; and the first frequency domain indication information and the M$_1$ pieces of first precoding indication information are used to determine T first elements, a k$^{th}$ first element in the T first elements is a factor of an element in an r$^{th}$ row and an s$^{th}$ column of W$_2^k$, and $1 < M_1 < T$; and a transceiver unit, configured to send the first frequency domain indication information and the M$_1$ pieces of first precoding indication information.

In an example, the processing unit is further configured to generate M$_1$ pieces of second precoding indication information, where the first frequency domain indication information and the M$_1$ pieces of second precoding indication information are used to determine T second elements, a k$^{th}$ second element in the T second elements is a factor of an element in a p$^{th}$ row and a q$^{th}$ column of W$_2^k$, R=2I, I is a positive integer, $1 \leq r \leq I$, and p=r+I; and the transceiver unit is further configured to send the M$_1$ pieces of second precoding indication information.

In an example, the processing unit is further configured to generate second frequency domain indication information and M$_2$ pieces of third precoding indication information, where the second frequency domain indication information is used to indicate L$_2$ frequency domain subbands in the T frequency domain subbands, and $1 \leq L_2 < T$; and the second frequency domain indication information and the M$_2$ pieces of third precoding indication information are used to determine T third elements, a k$^{th}$ third element in the T third elements is a factor of an element in a u$^{th}$ row and a v$^{th}$ column of W$_2^k$, and $1 < M_2 < T$, where u is not equal to r, or v is not equal to s; and the transceiver unit is further configured to send the second frequency domain indication information and the M$_2$ pieces of third precoding indication information.

In an example, the processing unit is further configured to generate M$_1$ pieces of fourth precoding indication information, where $S \geq 2$, the first frequency domain indication information and the $M_1$ pieces of fourth precoding indication information are used to determine T fourth elements, a $k^{th}$ fourth element in the T fourth elements is a factor of an element in the $r^{th}$ row and a $t^{th}$ column of $W_2^k$, and t is not equal to s; and the transceiver unit is further configured to send the $M_1$ pieces of fourth precoding indication information.

In an example, the processing unit is further configured to determine $M_1$ frequency domain subbands in the T frequency domain subbands, where the $M_1$ frequency domain subbands include the $L_1$ frequency domain subbands, and $L_1 \leq M_1$;

the processing unit is further configured to determine $M_1$ first elements that are in a one-to-one correspondence with the $M_1$ frequency domain subbands, where the T first elements include the $M_1$ first elements;

the processing unit is configured to generate the first frequency domain indication information based on the $L_1$ frequency domain subbands; and the processing unit is further configured to determine $T-M_1$ first elements in the T first elements except the $M_1$ first elements in an interpolation manner based on the $M_1$ frequency domain subbands and the $M_1$ first elements.

According to a fourth aspect, an embodiment of this application provides a communications apparatus, where the communications apparatus may be a communications device or a chip. The communications device may be an access network device. The communications apparatus may implement the method according to the second aspect and has a corresponding functional unit. The functional unit may be implemented by hardware, or may be implemented by software, or may be implemented by hardware executing corresponding software. The hardware or software includes one or more modules corresponding to the foregoing functions.

The communications apparatus includes:

a transceiver unit, configured to receive first frequency domain indication information and $M_1$ pieces of precoding indication information, where the first frequency domain indication information is used to indicate $L_1$ frequency domain subbands in T frequency domain subbands, the T frequency domain subbands are a system bandwidth or a part of the system bandwidth, $L_1 < T$, the T frequency domain subbands are in a one-to-one correspondence with T precoding matrices, and a precoding matrix $W^k$ corresponding to a $k^{th}$ frequency domain subband satisfies:

$$W^k = W_1 \times W_2^k, \text{ where}$$

$W_1$ represents a matrix with $N_t$ rows and R columns, and $W_2^k$ represents a matrix with R rows and S columns; and a processing unit, configured to determine T first elements based on the first frequency domain indication information and the $M_1$ pieces of first precoding indication information, where a $k^{th}$ first element in the T first elements is a factor of an element in an $r^{th}$ row and an $s^{th}$ column of $W_2^k$, and $1 < M_1 < T$.

In an example, the transceiver unit is further configured to receive $M_1$ pieces of second precoding indication information; and the processing unit is further configured to determine T second elements based on the first frequency domain indication information and the $M_1$ pieces of second precoding indication information, where a $k^{th}$ second element in the T second elements is a factor of an element in a $p^{th}$ row and a $q^{th}$ column of $W_2^k$, R=2I, I is a positive integer, $1 \leq r \leq I$, and p=r+I.

In an example, the transceiver unit is further configured to receive second frequency domain indication information and $M_2$ pieces of third precoding indication information, where the third frequency domain indication information is used to indicate $L_2$ frequency domain subbands in the T frequency domain subbands, and $1 \leq L_2 < T$; and the processing unit is further configured to determine T third elements based on the second frequency domain indication information and the $M_2$ pieces of third precoding indication information, where a $k^{th}$ third element in the T third elements is a factor of an element in a $u^{th}$ row and a $v^{th}$ column of $W_2^k$, and $1 < M_2 < T$, where u is not equal to r, or v is not equal to s.

In an example, the transceiver unit is further configured to receive $M_1$ pieces of fourth precoding indication information; and the processing unit is further configured to determine T fourth elements based on the first frequency domain indication information and the $M_1$ pieces of fourth precoding indication information, where $S \geq 2$, a $k^{th}$ fourth element in the T fourth elements is a factor of an element in the $r^{th}$ row and a $t^{th}$ column of $W_2^k$, and t is not equal to s.

In an example, the processing unit is further configured to determine $M_1$ frequency domain subbands in the T frequency domain subbands based on the first frequency domain indication information, where the $M_1$ frequency domain subbands include the $L_1$ frequency domain subbands, and $L_1 \leq M_1$;

the processing unit is configured to determine $M_1$ first elements in the T first elements based on the $M_1$ pieces of first precoding indication information, where the $M_1$ frequency domain subbands are in a one-to-one correspondence with the $M_1$ first elements; and the processing unit is configured to determine $T-M_1$ first elements in the T first elements except the $M_1$ first elements in an interpolation manner based on the first frequency domain indication information and the $M_1$ first elements.

In the first to fourth aspects, there are the following optional designs:

In an example, $N_t$ is an even number, $X_1$ represents a matrix with $$\frac{N_t}{2}$$

rows and I columns, and $X_1 = [b_1 \ b_2 \ \ldots \ b_I]$, where a vector $b_d$ is a column vector including $$\frac{N_t}{2}$$

elements, $1 \leq d \leq I$, is a positive integer greater than or equal to 1, and $N_t$ is an even number; and $W_2^k$ represents a matrix with 2I rows and S columns, and $a_{i,j}^k$ represents an element in an $i^{th}$ row and a $j^{th}$ column of $W_2^k$.

In an example, $c_{i,j}^k$ represents one of the following:
$c_{i,j}^k$ is a multiplication factor of $a_{i,j}^k$;
$c_{i,j}^k$ is a real part of a multiplication factor of $a_{i,j}^k$;
$c_{i,j}^k$ is an imaginary part of a multiplication factor of $a_{i,j}^k$;
$c_{i,j}^k$ represents an amplitude of $a_{i,j}^k$;
$c_{i,j}^k$ represents a phase of $a_{i,j}^k$;
$c_{i,j}^k$ represents an amplitude of a multiplication factor of $a_{i,j}^k$; and
$c_{i,j}^k$ represents a phase of a multiplication factor of $a_{i,j}^k$.

In an example, i=r, and j=s. The T first elements are $c_{i,j}^k$.

In an example, i=p=r+1, and j=q. The T second elements are $c_{i,j}^k$.

In an example, i=u, j=v, and u is not equal to r or v is not equal to s. The T third elements are $c_{i,j}^k$.

In an example, i=r, j=t, and t is not equal to s. The T fourth elements are $c_{i,j}^k$.

In an example, $a_{i,j}^k$ satisfies:

$$a_{i,j}^k = p_{i,j}^{(WB)} \cdot p_{i,j}^k \cdot z_{i,j}^k, \text{ where}$$

$p_{i,j}^{(WB)}$ represents a wideband amplitude and is a non-negative real number, $p_{i,j}^k$ represents a subband amplitude and is a non-negative real number, $z_{i,j}^k$ represents a phase, and $z_{r,s}^k$ is a complex number whose modulus is 1.

In an example, $c_{i,j}^k$ represents one of the following:
$c_{i,j}^k$ is $p_{i,j}^k$;
$c_{i,j}^k$ is $p_{i,j}^{(WB)} \cdot p_{i,j}^k$;
$c_{i,j}^k$ is $z_{i,j}^k$;
$c_{i,j}^k$ is a real part of $z_{i,j}^k$;
$c_{i,j}^k$ is an imaginary part of $z_{i,j}^k$;
$c_{i,j}^k$ is $p_{i,j}^{(WB)} \cdot z_{i,j}^k$;
$c_{i,j}^k$ is a real part of $p_{i,j}^{(WB)} \cdot z_{i,j}^k$;
$c_{i,j}^k$ is an imaginary part of $p_{i,j}^{(WB)} \cdot z_{i,j}^k$;
$c_{i,j}^k$ is $p_{i,j}^k \cdot z_{i,j}^k$;
$c_{i,j}^k$ is a real part of $p_{i,j}^k \cdot z_{i,j}^k$; and
$c_{i,j}^k$ is an imaginary part of $p_{i,j}^k \cdot z_{i,j}^k$.

In an example, $w_1$ is an identity matrix. In this case, $w=w_2$ or $w=w_2^k$.

According to a fifth aspect, an embodiment of this application provides a channel quality information sending method, where the method includes:

generating fourth frequency domain indication information and $M_3$ CQIs, where the T CQIs are in a one-to-one correspondence with T frequency domain subbands, the fourth frequency domain indication information is used to indicate $L_3$ frequency domain subbands in the T frequency domain subbands, $1 \leq L_3 < T$, the fourth frequency domain indication information and the $M_3$ CQIs are used to determine the T CQIs, and $1 < M_3 < T$; and sending the fourth frequency domain indication information and the $M_3$ CQIs.

According to a sixth aspect, this application further provides a channel quality information receiving method, where the method includes:

receiving fourth frequency domain indication information and $M_3$ CQIs;

determining $L_3$ frequency domain subbands in T frequency domain subbands based on the fourth frequency domain indication information, where $1 \leq L_3 < T$; and obtaining T CQIs for the T frequency domain subbands based on the fourth frequency domain indication information and the $M_3$ CQIs, where the T CQIs are in a one-to-one correspondence with the T frequency domain subbands.

According to a seventh aspect, an embodiment of this application provides a communications apparatus, where the communications apparatus may be a communications device or a chip. The communications device may be a terminal device. The communications apparatus may implement the method according to the fifth aspect and has a corresponding functional unit. The functional unit may be implemented by hardware, or may be implemented by software, or may be implemented by hardware executing corresponding software. The hardware or software includes one or more modules corresponding to the foregoing functions.

The communications apparatus includes:

a processing unit, configured to generate fourth frequency domain indication information and $M_3$ CQIs, where the T CQIs are in a one-to-one correspondence with T frequency domain subbands, the fourth frequency domain indication information is used to indicate $L_3$ frequency domain subbands in the T frequency domain subbands, $L_3 < T$, the fourth frequency domain indication information and the $M_3$ CQIs are used to determine the T CQIs, and $1 < M_3 < T$; and a transceiver unit, configured to send the fourth frequency domain indication information and the $M_3$ CQIs.

According to an eighth aspect, an embodiment of this application provides a communications apparatus, where the communications apparatus may be a communications device or a chip. The communications device may be an access network device. The communications apparatus may implement the method according to the sixth aspect and has a corresponding functional unit. The functional unit may be implemented by hardware, or may be implemented by software, or may be implemented by hardware executing corresponding software. The hardware or software includes one or more modules corresponding to the foregoing functions.

The communications apparatus includes:

a receiving unit, configured to receive fourth frequency domain indication information and $M_3$ CQIs; and a processing unit, configured to determine $L_3$ frequency domain subbands in T frequency domain subbands based on the fourth frequency domain indication information, where $L_3 < T$; where the processing unit is further configured to obtain T CQIs for the T frequency domain subbands based on the fourth frequency domain indication information and the $M_3$ CQIs, where the T CQIs are in a one-to-one correspondence with the T frequency domain subbands.

According to a ninth aspect, an embodiment of this application provides a computer storage medium, configured to store a computer software instruction used by the foregoing communications apparatus, where the computer software instruction includes a program for performing the first aspect, the second aspect, the fifth aspect, or the sixth aspect.

According to a tenth aspect, an embodiment of this application provides a computer program product, where the computer program product includes an instruction, and when the computer program is executed by a computer, the instruction enables the computer to perform the method according to the first aspect, the second aspect, the fifth aspect, or the sixth aspect.

According to an eleventh aspect, an embodiment of this application provides a system, where the system includes the foregoing communications apparatus.

According to a twelfth aspect, an embodiment of this application provides a chip system, where the chip system includes a processor, configured to support the foregoing communications apparatus in implementing functions in the foregoing aspects, for example, generating or processing data and/or information in the foregoing methods. In a possible design, the chip system may further include a memory, where the memory is configured to store a program instruction and data that are necessary for a data sending device. The chip system may include a chip or may include a chip and another discrete device.

Compared with the prior art, according to the channel state information sending method, the communications apparatus, and the system provided in this application, a quantity of bits of channel state information that are fed back by the terminal device is reduced. Further, system overheads are reduced, and system resource utilization is improved.

DESCRIPTION OF EMBODIMENTS

To make the objectives, technical solutions, and advantages of this application clearer, the following further describes this application in detail with reference to the accompanying drawings. It should be noted that, the technical solutions and features in the embodiments of the present invention may be mutually combined when they do not conflict with each other.

It should be noted that, a channel state information feedback method in this application may be performed by a communications apparatus. On a network side, the communications apparatus may be an access network device or a chip in an access network device. In other words, the access network device or the chip in the access network device may perform the channel state information feedback method in this application. On a terminal device side, the communications apparatus may be a terminal device or a chip in a terminal device. In other words, the terminal device or the chip in the terminal device may perform the channel state information feedback method in this application.

For ease of description, this application describes a wireless communication method by using an example in which the communications apparatus is an access network device or a terminal device. For an implementation method in which the communications apparatus is a chip in an access network device or a chip in a terminal device, refer to specific descriptions of a method for feeding back channel state information by the access network device or the terminal device. Details are not described again.

Figure 1:
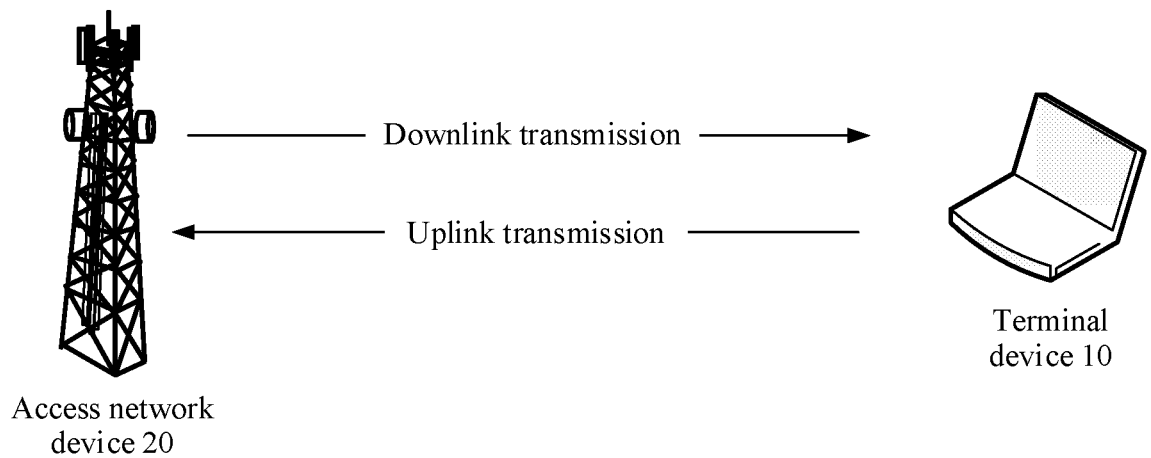
FIG. 1 is a schematic diagram of a wireless communications system according to this application.

FIG. 1 is a schematic diagram of a possible network architecture according to this application. The network architecture includes at least one terminal device 10, and the terminal device 10 communicates with an access network device 20 through a radio interface. For clarity, only one access network device and one terminal device are shown in the figure. A channel used by the access network device to send data to the terminal device is a downlink channel. A channel used by the terminal device to send data to the access network device is an uplink channel.

The terminal device is a device with a wireless transceiver function. The terminal device may be deployed on land, including an indoor or outdoor device, a handheld device, or a vehicle-mounted device; or may be deployed on the water (for example, a ship); or may be deployed in the air (for example, an airplane, a balloon, or a satellite). The terminal may be a mobile phone, a tablet (pad), a computer with a wireless transceiver function, a virtual reality (VR) terminal, an augmented reality (AR) terminal, a wireless terminal in industrial control (industrial control), a wireless terminal in self driving, a wireless terminal in telemedicine (remote medical), a wireless terminal in a smart grid (smart grid), a wireless terminal in transportation safety (transportation safety), a wireless terminal in a smart city, a wireless terminal in a smart home, or the like.

The access network device is a device that connects a terminal device to a wireless network. The access network device includes but is not limited to a gNB in 5G, an evolved NodeB (eNB), a radio network controller (RNC), a NodeB (NB), a base station controller (base station controller, BSC), a base transceiver station (BTS), a home base station (for example, a home evolved nodeB or a home node B, HNB), a baseband unit (BBU), a gNodeB (gNB), a transmission point (transmitting and receiving point, TRP), a transmission point (transmitting point, TP), a mobile switching center, and the like. In addition, the access network device may further include a Wi-Fi access point (AP) and the like.

Figure 2:
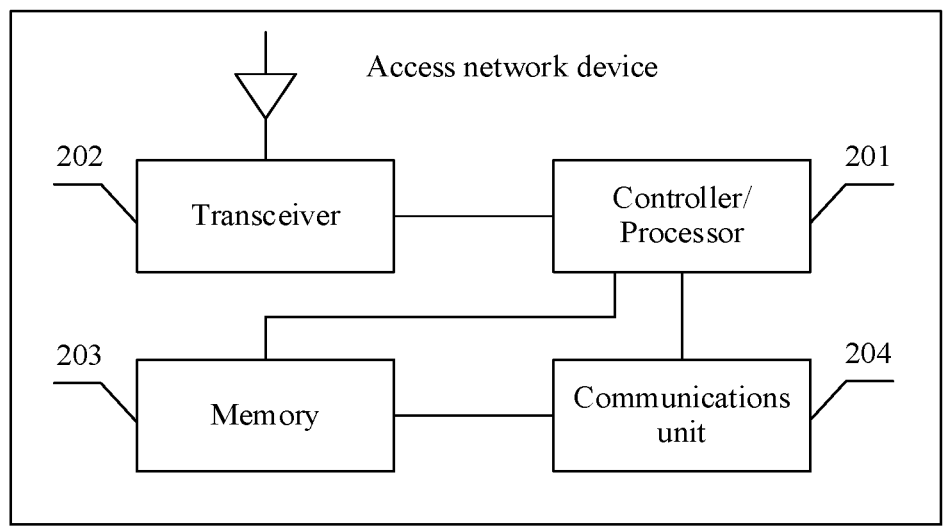
FIG. 2 is a schematic diagram of a possible structure of an access network device in the foregoing wireless communications system.

Further, FIG. 2 is a schematic diagram of a possible structure of the access network device 20. The access network device 20 may include a controller/processor 201 (the following uses the processor 201 as an example for description), and a transceiver 202. The controller/processor 201 may sometimes be referred to as a modem processor (modem processor). The modem processor 201 may include a baseband processor (BBP) (not shown). The baseband processor processes a received digitized signal, to extract information or a data bit transmitted in the signal. The BBP is usually implemented in one or more digital signal processors (DSP) in the modem processor 201. Alternatively, the BBP may be implemented by using a separate integrated circuit (IC).

The transceiver 202 may be configured to: support the access network device 20 in sending information to a terminal device and receiving information from the terminal device, and support radio communication with the terminal device. On an uplink, an uplink signal from the terminal device is received by using an antenna. The transceiver 202 performs adjustment (for example, filtering, amplification, down-conversion, and digitization) on the signal that is received by using the antenna and provides an input sample. Further, the processor 201 processes the input sample to restore service data and/or signaling information sent by the terminal device. On a downlink, service data and/or a signaling message are/is processed by the terminal device and modulated by the transceiver 202 to generate a downlink signal, and the downlink signal is transmitted to the terminal device by using an antenna. The access network device 20 may further include a memory 203, and the memory 203 may be configured to store program code and/or data of the access network device 20. The transceiver 202 may include an independent receiver circuit and an independent transmitter circuit, or may include one circuit configured to implement sending and receiving functions. The access network device 20 may further include a communications unit 204, configured to support the access network device 20 in communicating with another network entity, for example, configured to support the access network device 102 in communicating with a network device and the like that are in a core network.

Figure 3:
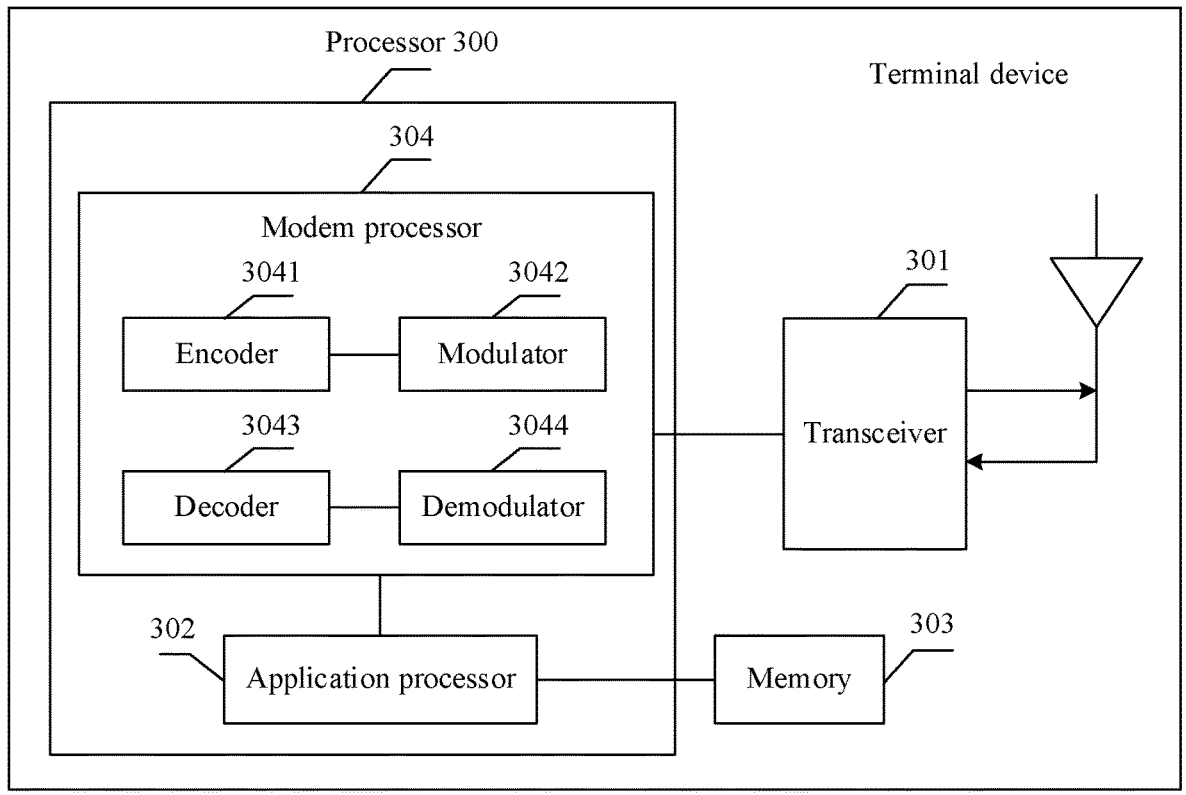
FIG. 3 is a schematic diagram of a possible structure of a terminal device in the foregoing wireless communications system.

FIG. 3 is a schematic diagram of a possible structure of a terminal device in the wireless communications system. The terminal device can perform the method provided in the embodiments of the present invention. The terminal device may be the terminal device 10 in FIG. 1. The terminal device includes a transceiver 301, a processor 300, and a memory 303. The processor 300 may include an application processor 302 and a modem processor 304.

The transceiver 301 may perform adjustment (for example, analog conversion, filtering, amplification, and up-conversion) on an output sample and generate an uplink signal. The uplink signal is transmitted to an access network device by using an antenna. On a downlink, a downlink signal transmitted by the access network device is received by using an antenna. The transceiver 301 may perform adjustment (for example, filtering, amplification, down-conversion, and digitization) on the signal that is received by using the antenna and provide an input sample.

The modem processor 304 is sometimes referred to as a controller/processor, and may include a baseband processor (BBP) (not shown). The baseband processor processes a received digitized signal, to extract information or a data bit transmitted in the signal.

In a design, the modem processor 304 may include an encoder 3041, a modulator 3042, a decoder 3043, and a demodulator 3044. The encoder 3041 is configured to encode a to-be-sent signal. For example, the encoder 3041 may be configured to receive service data and/or a signaling message that are/is to be sent on an uplink and perform processing (for example, formatting, encoding, or interleaving) on the service data and the signaling message. The modulator 3042 is configured to modulate a signal output by the encoder 3041. For example, the modulator may perform processing such as symbol mapping and/or modulation on the signal (data and/or signaling) output by the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304.

The modem processor 304 receives, from the application processor 302, digitized data that may represent voice, data, or control information, and processes the digitized data for transmission. The modem processor may support one or more of wireless communication protocols, such as LTE, new radio (NR), universal mobile communications system (UMTS), and high speed packet access (HSPA), of a plurality of communications systems. Optionally, the modem processor 304 may include one or more memories.

Optionally, the modem processor 304 and the application processor 302 may be integrated into one processor chip.

The memory 303 is configured to store program code (sometimes referred to as a program, an instruction, software, or the like) and/or data that are/is used to support the terminal device in communication.

It should be noted that, the memory 203 or the memory 303 may include one or more storage units. For example, the storage unit may be a storage unit that is in the processor 201, the modem processor 304, or the application processor 302 and configured to store program code, or may be an external storage unit independent of the processor 201, the modem processor 304, or the application processor 302, or may be a component that includes a storage unit in the processor 201, the modem processor 304, or the application processor 302 and an external storage unit independent of the processor 201, the modem processor 304, or the application processor 302.

The processor 201 and the modem processor 304 may be processors of a same type or processors of different types. For example, the processor 201 and the modem processor 304 each may be implemented as a central processing unit (CPU), a general-purpose processor, a digital signal processor (DSP), an application-specific integrated circuit (ASIC), a field programmable gate array (FPGA), or another programmable logic device, a transistor logic device, a hardware component, another integrated circuit, or any combination thereof. The processor 201 and the modem processor 304 may implement or execute various example logical blocks, modules, and circuits described with reference to content disclosed in the embodiments of the present invention. Alternatively, the processor may be a combination of components implementing computing functions, for example, a combination of one or more microprocessors, a combination of a DSP and a microprocessor, or a system on a chip (SOC).

Figure 4:
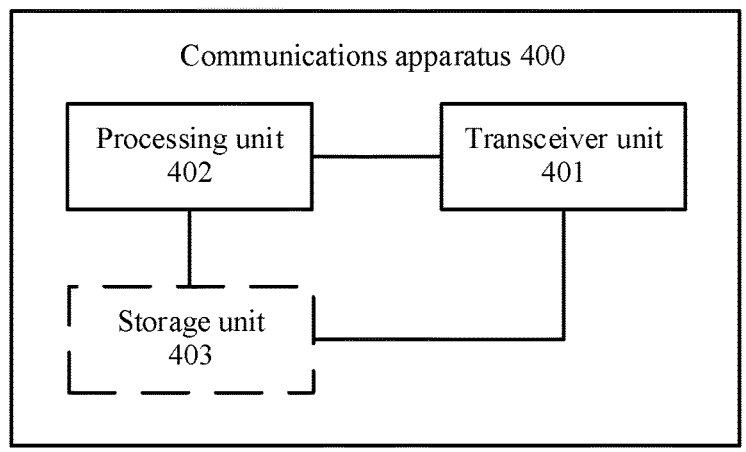
FIG. 4 is a schematic block diagram of a communications apparatus according to an embodiment of this application.

FIG. 4 shows a communications apparatus 400. The communications apparatus can be applied to the communications system shown in FIG. 1. The communications apparatus 400 may implement a communication method performed by the terminal device in the embodiments of this application, or may implement a communication method performed by the access network device in the embodiments of this application. The apparatus 200 includes at least one processing unit 402 and a transceiver unit 401. Optionally, the communications apparatus 400 further includes a storage unit 403. The processing unit 402, the transceiver unit 401, and the storage unit 403 are connected to each other by using a circuit. The storage unit 403 is configured to store application program code used to execute the solutions of this application, and the processing unit 402 controls execution of the application program code. The processing unit 402 is configured to execute the application program code stored in the storage unit 403.

When the communications apparatus 400 is the access network device, the transceiver unit 401 may be the transceiver 202, the storage unit 403 may be the memory 203, and the processing unit 402 may be the controller/processor 201; when the communications apparatus is the terminal device, the transceiver unit 401 may be the transceiver 301, the storage unit 403 may be the memory 303, and the processing unit 402 may be the processor 300.

In a possible design, when the communications apparatus 400 is a chip in an access network device or a chip in a terminal device, the processing unit 402 may be a processor, and the transceiver unit 401 may be an input/output interface, a pin, a circuit, or the like. The processing unit 402 may execute a computer-executable instruction stored in the storage unit 403, so that the chip performs the wireless communication method in the embodiments of this application. Optionally, the storage unit is a storage unit in the chip, for example, a register or a buffer, or the storage unit may be a storage unit in the base station or the terminal but outside the chip, for example, a ROM or another type of static storage device that can store static information and an instruction, or a RAM.

In this application, interpolation includes but is not limited to the following interpolation methods:

linear interpolation, polynomial interpolation, quadratic interpolation, and wavelet interpolation.

Assuming that an element c in an $a^{th}$ row and a $b^{th}$ column of a matrix A may be a variable or a constant, in this application, a factor of the element c in the $a^{th}$ row and the $b^{th}$ column of the matrix A is defined as follows:

The factor of the element c in the $a^{th}$ row and the $b^{th}$ column of A may be c or a multiplication factor of c. The multiplication factor of c is defined as follows:

If $c=c_1 \times c_2 \times \ldots c_n$, any one of $c_1$ to $c_n$ is a multiplication factor of c.

The factor of the element c in the $a^{th}$ row and the $b^{th}$ column of A may alternatively be a real part or an imaginary part of a multiplication factor of c.

The factor of the element c in the $a^{th}$ row and the $b^{th}$ column of A may alternatively be a real part or an imaginary part of c.

The factor of the element c in the $a^{th}$ row and the $b^{th}$ column of A may alternatively be an amplitude or a phase of a multiplication factor of c. For example, $c_1 = D \times e^{j\alpha}$. D is a real number and represents an amplitude of a multiplication factor $c_1$. $e^{j\alpha}$ represents a phase of the multiplication factor $c_1$.

In this application, a system bandwidth is a bandwidth that is allocated to the access network device and is used to send/receive data to/from the terminal device in the access network device. The system bandwidth may include a downlink system bandwidth and an uplink system bandwidth.

In this application, the system bandwidth may be divided into a plurality of frequency domain subbands. For example, the system bandwidth is 10 MHz and is divided into 10 frequency domain subbands, and each frequency domain subband has a bandwidth of 1 MHz. The frequency domain subband is referred to as a subband for short.

In this application, channel state information may include one or more of a rank indicator, precoding indication information, and a channel quality indicator (CQI). The precoding indication information is information that indicates a precoding matrix, an element in a precoding matrix, or a factor of an element in a precoding matrix. The precoding indication information may be a PMI.

In a MIMO system, a structure of a high-precision codebook is defined as follows:

A precoding matrix W satisfies formula (1):

$$w = w_1 \times w_2 \quad (1)$$

$W_1$ represents a block diagonal matrix.

$$W_1 = \begin{bmatrix} X & 0 \\ 0 & X \end{bmatrix} \quad (2)$$

$w_1$ represents a matrix with $N_t$ rows and 2I columns, and $W_2^k$ represents a matrix with 2I rows and S columns. Each block matrix X includes I vectors, and $X=[b_1\ b_2\ \ldots\ b_I]$. $b_d$ is a column vector, and $1 \leq d \leq I$. For example, different vectors $b_d$ are orthogonal to each other. Optionally, $b_d$ is a two-dimensional discrete Fourier transform (Discrete Fourier Transform, DFT) vector. In other words, $d_d$ may represent a Kronecker product (Kronecker Product) of two one-dimensional DFT vectors.

When a rank is equal to 1 ($W_2$ has one column), $W_2$ satisfies formula (3):

$$W_2 = \begin{bmatrix} p_{1,1}^{(WB)} \cdot p_{1,1}^{(SB)} \cdot z_{1,1} \\ p_{2,1}^{(WB)} \cdot p_{2,1}^{(SB)} \cdot z_{2,1} \\ \vdots \\ p_{I,1}^{(WB)} \cdot p_{I,1}^{(SB)} \cdot z_{I,1} \\ p_{I+1,1}^{(WB)} \cdot p_{I+1,1}^{(SB)} \cdot z_{I+1,1} \\ p_{I+2,1}^{(WB)} \cdot p_{I+2,1}^{(SB)} \cdot z_{I+2,1} \\ \vdots \\ p_{2I,1}^{(WB)} \cdot p_{2I,1}^{(SB)} \cdot z_{2I,1} \end{bmatrix} \quad (3)$$

When a rank is equal to 2 ($W_2$ has two columns), $W_2$ satisfies formula:

$$W_2 = \begin{bmatrix} p_{1,1}^{(WB)} \cdot p_{1,1}^{(SB)} \cdot z_{1,1} & p_{1,2}^{(WB)} \cdot p_{1,2}^{(SB)} \cdot z_{1,2} \\ p_{2,1}^{(WB)} \cdot p_{2,1}^{(SB)} \cdot z_{2,1} & p_{2,2}^{(WB)} \cdot p_{2,2}^{(SB)} \cdot z_{2,2} \\ \vdots & \vdots \\ p_{I,1}^{(WB)} \cdot p_{I,1}^{(SB)} \cdot z_{I,1} & p_{I,2}^{(WB)} \cdot p_{I,2}^{(SB)} \cdot z_{I,2} \\ p_{I+1,1}^{(WB)} \cdot p_{I+1,1}^{(SB)} \cdot z_{I+1,1} & p_{I+1,2}^{(WB)} \cdot p_{I+1,2}^{(SB)} \cdot z_{I+1,2} \\ p_{I+2,1}^{(WB)} \cdot p_{I+2,1}^{(SB)} \cdot z_{I+2,1} & p_{I+2,2}^{(WB)} \cdot p_{I+2,2}^{(SB)} \cdot z_{I+2,2} \\ \vdots & \vdots \\ p_{2I,1}^{(WB)} \cdot p_{2I,1}^{(SB)} \cdot z_{2I,1} & p_{2I,2}^{(WB)} \cdot p_{2I,2}^{(SB)} \cdot z_{2I,2} \end{bmatrix} \quad (4)$$

In formula (3) and formula (4), multiplication factors $p_{r,s}^{(WB)}$ and $p_{r,s}^{(SB)}$ of an element in an $r^{th}$ row and an $s^{th}$ column of the matrix $W_2$ represent a wideband amplitude and a subband amplitude respectively. $p_{r,s}^{(WB)} \in \{1, \sqrt{0.5}, \sqrt{0.25}, \sqrt{0.125}, \sqrt{0.0625}, \sqrt{0.0313}, \sqrt{0.0313}, \sqrt{0.0156}, 0\}$, and $p_{r,s}^{(SB)} \in \{1, \sqrt{0.5}\}$. $z_{r,s}$ indicates phase information. For example, $$z_{r,s} \in \{e^{j\frac{\pi n}{2}}, n = 0, 1, 2, 3\}, \text{ or } z_{r,s} \in \{e^{j\frac{\pi n}{4}}, n = 0, 1, 2, 3, \ldots, 7\}$$

r represents a row of the matrix $W_2$, and s represents a column of the matrix $W_2$. When an antenna array is a dual-polarized antenna array, elements in a $1^{st}$ row to an $I^{th}$ row of $W_2$ are used to weight data on an antenna in one polarization direction, while elements in an $(I+1)^{th}$ row to a $(2I)^{th}$ row of $W_2$ are used to weight data on an antenna in the other polarization direction. Elements in the $r^{th}$ row and an $(r+I)^{th}$ row of $W_2$ are used to weight data sent on antennas in different polarization directions at a same location of the antenna array. In this case, $1 \leq r \leq I$.

For the high-precision codebook, a terminal device needs to feed back values of multiplication factors $p_{r,s}^{(WB)}$, $p_{r,s}^{(SB)}$, and $z_{r,s}$ of each element in $W_2$. Consequently, a large quantity of bits of precoding indication information need to be fed back. For example, when the terminal device feeds back a PMI based on the rank of 1, in a condition that a parameter I in formula (2) is 4 and precoding indication information for 10 frequency domain subbands is fed back, approximately 270 bits need to be fed back; when the terminal device feeds back precoding indication information based on the rank of 2, in the same condition, approximately 540 bits need to be fed back. Consequently, feedback overheads of the terminal device are large, and resource utilization is reduced.

Based on the communications system shown in FIG. 1, a channel state information feedback method in wireless communication provided in this application is intended to resolve the foregoing technical problem.

Figure 5:
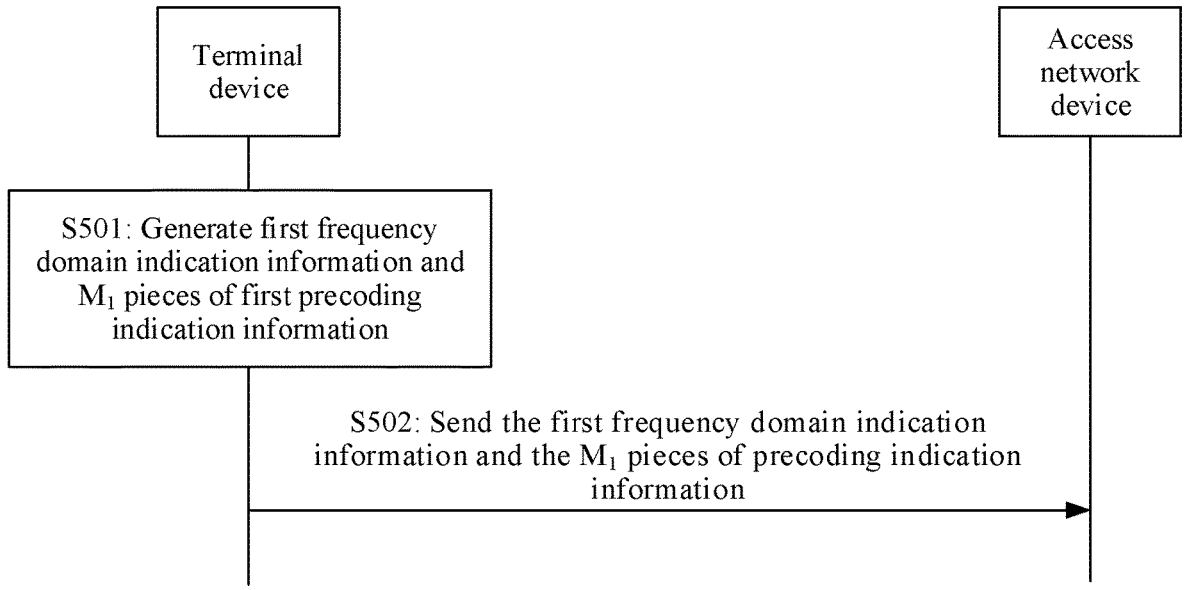
FIG. 5 is a schematic diagram of a channel state information feedback method according to this application.

FIG. 5 is a schematic diagram of a wireless communication method according to an embodiment of this application. In FIG. 5, the wireless communication method provided in this application is described by using an example in which a sending device is a terminal device and a receiving device is an access network device.

Step 501: The terminal device generates first frequency domain indication information and $M_1$ pieces of first precoding indication information.

In step 501, the terminal device generates the first frequency domain indication information and the $M_1$ pieces of first precoding indication information. The first frequency domain indication information is used to indicate $L_1$ frequency domain subbands in T frequency domain subbands, the T frequency domain subbands are a system bandwidth or a part of the system bandwidth, and $1 \leq L_1 < T$. The T frequency domain subbands are in a one-to-one correspondence with T precoding matrices, and a precoding matrix $w^k$ corresponding to a $k^{th}$ frequency domain subband satisfies:

$$W^k = W_1 \times W_2^k.$$

$w_1$ represents a matrix with $N_t$ rows and R columns, and $W_2$ represents a matrix with R rows and S columns. For example, $N_t$ indicates a quantity of transmit antenna ports, S indicates a quantity of layers in data transmission and also indicates a quantity of ranks.

For a value range of k, $1 \leq k \leq T$, or $0 \leq k \leq T-1$. When a start number of the T frequency domain subbands is 0, $0 \leq k \leq T-1$; when a start number of the T frequency domain subbands is 1, $1 \leq k \leq T$.

That the T frequency domain subbands are a system bandwidth means that the system bandwidth consists of the T frequency domain subbands. The T frequency domain subbands may alternatively be a part of the system bandwidth. For example, the system bandwidth is 10 MHz and is divided into 10 frequency domain subbands. When T=10, the T frequency domain subbands may exactly constitute the system bandwidth. When T<10, the T frequency domain subbands is a part of the system bandwidth.

That the T frequency domain subbands are in a one-to-one correspondence with T precoding matrices means that one precoding matrix is needed for one frequency domain subband. The precoding matrix is recommended by the terminal device to the access network device by using precoding indication information. When the access network device sends data to the terminal device on a frequency domain subband, the terminal device expects the access network device to precode the data by using a precoding matrix corresponding to the frequency domain subband.

The first frequency domain indication information and the $M_1$ pieces of first precoding indication information are used to determine T first elements, a $k^{th}$ first element in the T first elements is a factor of an element in an $r^{th}$ row and an $s^{th}$ column of $W_2^k$, and $1 \leq M_1 < T$.

In an example, an element $a_{r,s}^k$ in an $r^{th}$ row and an $s^{th}$ column of $W_2^k$ is equal to $p_{r,s}^{(WB)} \cdot p_{r,s}^k \cdot z_{r,s}^k$, $1 \leq r \leq R$, and $1 \leq s \leq S$. In this case, $W_2^k$ is equivalent to the foregoing matrix A with a rows and b columns, r=a, and b=s. $a_{i,j}^k$ is equivalent to the element c in the $a^{th}$ row and the $b^{th}$ column of A. $p_{r,s}^{(WB)}$, $p_{r,s}^{(WB)}$, and $p_{r,s}^k$ are equivalent to multiplication factors $c_1$, $c_2$, and $c_3$ of c respectively.

$p_{r,s}^{(WB)}$ represents wideband amplitude information, and $p_{r,s}^{(WB)}$ is the same for all frequency domain subbands and does not change with a frequency domain subband k. $p_{r,s}^k$ represents subband amplitude information, and $p_{r,s}^k$ may vary with k. $z_{r,s}^k$ represents a phase, and $z_{r,s}^k$ may vary with k. In other words, values of $p_{r,s}^k$ and $z_{r,s}^k$ vary with the subband k.

Assuming that T=13 and the start number of the T frequency domain subbands is 0, $0 \leq k \leq 12$. In addition, assuming that the factor of the element in the $r^{th}$ row and the $s^{th}$ column of $W_2$ is $z_{r,s}^k$, there are 13 first elements: $z_{r,s}^0$, $z_{r,s}^1$, ..., and $z_{r,s}^{12}$. The $k^{th}$ first element in the T first elements is $z_{r,s}^k$, and $0 \leq k \leq 12$. For example, in the T first elements, a $0^{th}$ first element is $z_{r,s}^0$, and a $1^{st}$ first element is $z_{r,s}^1$.

In an example, $$w_1 = \begin{bmatrix} x_1 & 0 \\ 0 & x_1 \end{bmatrix}.$$

$N_t$ is an even number, $X_1$ represents a matrix with $$\frac{N_t}{2}$$

rows and I columns, and $X_1 = [b_1 \; b_2 \; \ldots \; b_I]$. A vector $b_d$ is a column vector including $$\frac{N_t}{2}$$

elements, $1 \leq d \leq I$, I is a positive integer greater than or equal to 1, and $N_t$ is an even number. In this case, R=2I, and $w^k$ represents a matrix with 2I rows and S columns. $a_{i,j}^k$ represents an element in an $i^{th}$ row and a $j^{th}$ column of $W_2^k$, $1 \leq i \leq R$, and $1 \leq j \leq S$. $W^k = W_1 \times W_2^k$ may satisfy a structure of the precoding matrix in formula (1) to formula (4). For example, $w^k$, $w_1$, and $W_2^k$ are equivalent to w, $w_1$, and $W_2$ respectively in formula (1) to formula (4). $W_2$ is a general structure for $W_2^k$.

In an example, $w_1$ is an identity matrix. In this case, $w = w_2$ or $w = w_2^k$.

This step may be implemented by the processor 300. When the communications apparatus in FIG. 4 is a terminal device or a chip of a terminal device, this step may alternatively be implemented by the processing unit 402.

Step 502: The terminal device sends the first frequency domain indication information and the $M_1$ pieces of first precoding indication information.

Figure 6A:
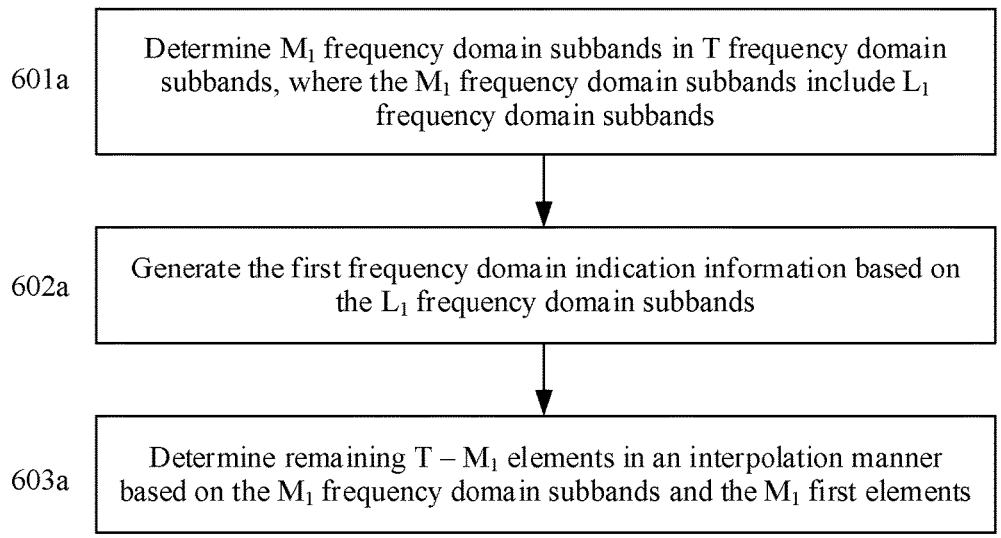
FIG. 6a is a schematic diagram of determining precoding indication information by a terminal device according to this application.

In an example, FIG. 6a is a schematic diagram of determining precoding indication information by a terminal device.

Step 601a: The terminal device determines $M_1$ frequency domain subbands in T frequency domain subbands, where the $M_1$ frequency domain subbands include $L_1$ frequency domain subbands.

In step 601a, the terminal device determines the $M_1$ frequency domain subbands in the T frequency domain subbands, where the $M_1$ frequency domain subbands include the $L_1$ frequency domain subbands, and $L_1 \leq M_1$. In addition, the terminal device determines $M_1$ first elements that are in a one-to-one correspondence with the $M_1$ frequency domain subbands, where the T first elements include the $M_1$ first elements. Because the $M_1$ first elements are factors of elements in $W_2^k$, the $M_1$ first elements correspond to the $M_1$ frequency domain subbands.

For example, T=13, $M_1$=4, and the $M_1$ frequency domain subbands determined by the terminal device are a subband 0, a subband 3, a subband 8, and a subband 12. In addition, $M_1$=$L_1$.

Step 602a: The terminal device generates the first frequency domain indication information based on the $L_1$ frequency domain subbands.

For example, the terminal device generates the first frequency domain indication information based on numbers (or indexes) of the subband 0, the subband 3, the subband 8, and the subband 12.

Step 603a: The terminal device determines remaining T−$M_1$ elements in an interpolation manner based on the $M_1$ frequency domain subbands and the $M_1$ first elements.

In step 603a, the terminal device determines the T−$M_1$ elements in the T first elements except the $M_1$ first elements in the interpolation manner based on the $M_1$ frequency domain subbands and the $M_1$ first elements.

Figure 6B:
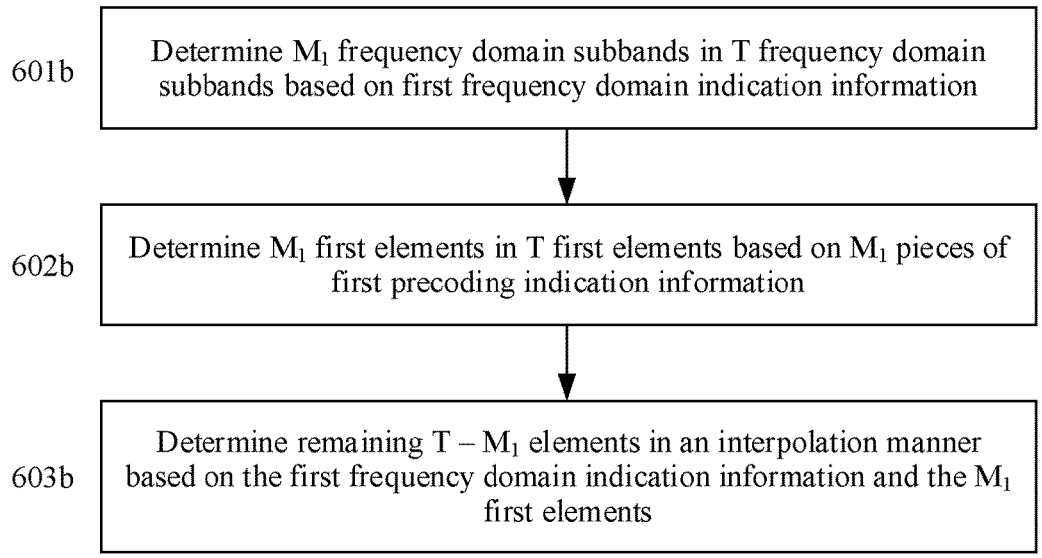
FIG. 6b is a schematic diagram of obtaining T first elements by an access network device according to this application.

In an example, FIG. 6b is a schematic diagram of obtaining T first elements by an access network device based on precoding indication information.

Step 601b: The access network device determines $M_1$ frequency domain subbands in T frequency domain subbands based on first frequency domain indication information.

In step 601b, the access network device determines the $M_1$ frequency domain subbands in the T frequency domain subbands based on the first frequency domain indication information, where the $M_1$ frequency domain subbands include the $L_1$ frequency domain subbands, and $L_1 \leq M_1$.

Step 602b: The access network device determines $M_1$ first elements in T first elements based on $M_1$ pieces of first precoding indication information.

In step 602b, the access network device determines the $M_1$ first elements in the T first elements based on the $M_1$ pieces of first precoding indication information, where the $M_1$ first elements are in a one-to-one correspondence with the $M_1$ frequency domain subbands.

Step 603b: The access network device determines remaining T−$M_1$ elements in an interpolation manner based on the first frequency domain indication information and the $M_1$ first elements.

In step 602b, the access network device determines the T−$M_1$ first elements in the T first elements except the $M_1$ first elements in the interpolation manner based on the first frequency domain indication information and the $M_1$ first elements.

For interpolation in step 603a and step 603b, specific descriptions are provided below. Details are not described herein.

Figure 7:
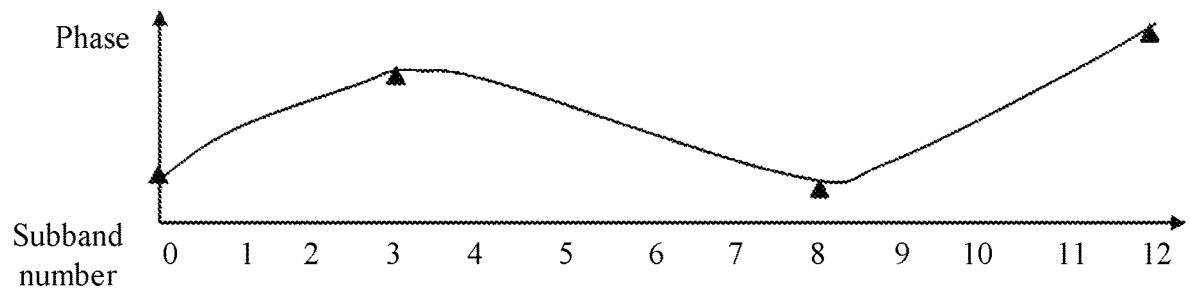
FIG. 7 is a schematic diagram of a change of channel state information in frequency domain according to this application.

FIG. 7 is a schematic diagram of a change of $z_{r,s}^k$ with respect to different frequency domain subbands when $W_2^k$ represents a matrix with eight rows and two columns, r=2, and s=1. $z_{2,1}^k$ is a phase factor in a $2^{nd}$ row and a $1^{st}$ column of $W_2^k$. In FIG. 7, a system bandwidth includes 13 subbands, and the 12 subbands are numbered 0 to 12. It can be learned from FIG. 7 that, for $z_{2,1}^k$, assuming that k indicates a number of a subband, 0≤k≤12. The subband 3 and the subband 8 are locations of inflection points for continuous phases. Locations of inflection points indicate that $z_{2,1}^k$ corresponding to a subband between two inflection points meets a monotonically increasing or monotonically decreasing characteristic. For example, phase factors $z_{2,1}^k$ corresponding to subbands between the subband 3 and the subband 8 meet the monotonically increasing or monotonically decreasing characteristic. The subband 3 and the subband 8 may also be considered as a local minimum point or a local maximum point of phase factors $z_{2,1}^k$. Provided that the phase factors $z_{2,1}^k$ corresponding to the subbands between the subband 3 and the subband 8 meet a distribution function, for example, linear distribution, $z_{2,1}^k$ corresponding to the subband 3 and the subband 8 may be used as parameters to represent $z_{2,1}^k$ corresponding to any subband between the subband 3 and the subband 8.

In an example, $L_1$ frequency domain in T frequency domain subbands include subbands corresponding to inflection points of $z_{2,1}^k$, may further include the $1^{st}$ subband in the system bandwidth (for example, the subband numbered 0 in FIG. 7), and may further include the last subband in the system bandwidth (for example, the subband numbered 12 in FIG. 7).

With reference to FIG. 7, $L_1$=4, and the $L_1$ subbands are the subbands numbered 0, 3, 8, and 12.

In an example, $M_1$=$L_1$, and the $M_1$ pieces of first precoding indication information indicate $M_1$ first elements. In addition, the $M_1$ elements are elements in an $r^{th}$ row and an $s^{th}$ column of $W_2^k$ corresponding to the $L_1$ frequency domain subbands.

It is assumed that r=2 and s=1. With reference to FIG. 7, the foregoing phase factor $z_{2,1}^k$ is used as an example. The $M_1$ first elements indicated by the $M_1$ pieces of first precoding indication information may be phase factors $z_{2,1}^k$ of elements in a $2^{nd}$ row and a $1^{st}$ column of precoding matrices $W_2^k$ corresponding to the frequency domain subbands numbered 0, 3, 8, and 12.

Because $M_1$<T, a terminal does not feed back precoding indication information for all the T frequency domain subbands, and feedback overheads of the terminal device are reduced.

In an example, the $M_1$ pieces of first precoding indication information carry information that indicates the $M_1$ first elements. For example, the $M_1$ elements are $Z_{r,s}^k$, and a value range of $z_{r,s}^k$ is $$z_{r,s}^k \in \{e^{j\frac{\pi n}{2}}, n = 0, 1, 2, 3\}.$$

One of the $M_1$ pieces of first precoding indication information needs two bits for indication. In this case, the $M_1$ pieces of first precoding indication information need $2M_1$ bits. Explicit indication includes an all bit indication manner and a differential indication manner. When there are Q states of an element indicated by one piece of indication information, $\lceil \log_2 Q \rceil$ bits are needed to indicate the Q states. If the Q states are indicated by the $\lceil \log_2 Q \rceil$ bits, this is the all bit indication manner. ⌈x⌉ indicates rounding up of x. The differential indication manner means that there is one reference point and a value of indication information indicates a differential value of the reference point. For example, the differential value is indicated by one bit.

For example, the $M_1$ pieces of first precoding indication information are used to indicate the phase factor $z_{r,s}^k$. The $M_1$ pieces of first precoding indication information explicitly indicate N elements in at least the following three manners. It is assumed that r=2, s=1, and the first frequency domain indication information indicates the frequency domain subbands numbered 0, 3, 8, and 12.

Explicit Indication Manner 1:

The $M_1$ pieces of first precoding indication information indicate values of $M_1$ $z_{2,1}^k$ in the all bit indication manner.

For example, the first frequency domain indication information indicates $z_{2,1}^k$ corresponding to the frequency domain subbands numbered 0, 3, 8, and 12, and k=0, 3, 8, or 12.

Explicit Indication Manner 2:

One of the $M_1$ pieces of first precoding indication information indicates $z_{2,1}^k$ corresponding to one frequency domain subband in the all bit indication manner. Remaining $M_1-1$ pieces of first precoding indication information indicate phase factors corresponding to remaining $M_1-1$ frequency domain subbands and differential values of the phase factors. For example, $M_1=4$. A $1^{st}$ piece of indication information in the $M_1-1$ pieces of first precoding indication information indicates $z_{2,1}^1$ corresponding to the frequency domain subband numbered 0, and k=0. Remaining three pieces of first precoding indication information indicate phase factors $z_{2,1}^k$ (k=3, 8, or 12) corresponding to the subbands numbered 3, 8, and 12 and differential values $\Delta_1$, $\Delta_2$, and $\Delta_3$ of $z_{2,1}^0$. In this case, $$z_{2,1}^3 = z_{2,1}^0 \times \Delta_1, z_{2,1}^8 = z_{2,1}^0 \times \Delta_2, \text{ and } z_{2,1}^{12} = z_{2,1}^0 \times \Delta_3.$$

Explicit Indication Manner 3:

One of the $M_1$ pieces of first precoding indication information indicates an absolute value of a phase factor $z_{2,1}^k$ corresponding to one of the frequency domain subbands, and remaining $M_1-1$ pieces of first precoding indication information each indicate a difference between adjacent subbands. The adjacent subbands herein are adjacent frequency domain subbands in frequency domain subbands indicated by the first frequency domain indication information. For example, the first frequency domain indication information indicates the frequency domain subbands numbered 0, 3, 8, and 12. The frequency domain subbands numbered 0 and 3 are adjacent, the subbands numbered 3 and 8 are adjacent, and so on.

For example, $M_1=4$. $1^{st}$ indication in $M_1$ pieces of precoding indication information determines $z_{2,1}^0$ corresponding to the subband numbered 0, and a $2^{nd}$ piece of precoding indication information indicates a differential value $\Delta_1$ between the subband numbered 3 and the subband numbered 0. Likewise, a $3^{rd}$ piece of precoding indication information indicates a differential value $\Delta_2$ between the subband numbered 8 and the subband numbered 3, and a $4^{th}$ piece of precoding indication information indicates a differential value $\Delta_3$ between the subband numbered 12 and the subband numbered 8.

In this case, $$z_{2,1}^3 = z_{2,1}^0 \times \Delta_1, z_{2,1}^8 = z_{2,1}^3 \times \Delta_2, \text{ and } z_{2,1}^{12} = z_{2,1}^3 \times \Delta_3.$$

In an example, a method for determining the remaining $T-M_1$ elements in the interpolation manner based on the $M_1$ first elements in step 603a in FIG. 6a and step 603b in FIG. 6a is provided. With reference to FIG. 7, the first frequency domain indication information indicates the frequency domain subbands numbered 0, 3, 8, and 12. $M_1=L_1=4$. The $M_1$ pieces of first precoding indication information carry the phase factors $z_{r,s}^k$ corresponding to the frequency domain subbands numbered 0, 3, 8, and 12, r=2, and s=1. $z_{r,s}^k$ corresponding to other subbands may be obtained in the interpolation manner. When $z_{r,s}^x$ and $z_{r,s}^y$ corresponding to frequency domain subbands numbered x and y are explicitly indicated by first precoding indication information, $z_{r,s}^l$ between the frequency domain subbands numbered x and y is obtained through interpolation, where x<l<y. For example, phase factors corresponding to the frequency domain subbands numbered 1 and 2 are obtained through interpolation based on the phase factors corresponding to the frequency domain subbands numbered 0 and 3, phase factors corresponding to the frequency domain subbands numbered 4 to 7 are obtained through interpolation based on the phase factors corresponding to the frequency domain subbands numbered 3 and 8, and so on. The interpolation manner (or an interpolation function) may be predefined in a protocol, or the access network device may notify the terminal device of a type of the interpolation manner by using signaling. An interpolation manner for $z_{r,s}^l$ may be expressed as $z_{r,s}^l = f(z_{r,s}^0, z_{r,s}^3, z_{r,s}^8, z_{r,s}^{12})$. l is not equal to 0, 3, 8, or 12, and f(•) represents the interpolation manner.

Optionally, $M_1 > L_1$. For example, in the system bandwidth, phase factors $z_{r,s}^k$ corresponding to the $1^{st}$ frequency domain subband and the last frequency domain subband always need to be reported by the terminal device. Therefore, to reduce overheads of indication information, the indication information does not include numbers of the $1^{st}$ frequency domain subband and the last frequency domain subband. The $M_1$ pieces of first precoding indication information include first precoding indication information corresponding to the $L_1$ subbands and first precoding indication information corresponding to the $1^{st}$ subband and the last subband. In this case, $M_1 = L_1 + 2$.

In an example, the first frequency domain indication information is used to indicate frequency domain positions corresponding to factors of elements in at least two rows of $W_2^k$. An antenna array of an access device is a dual-polarized antenna array. R=2I, and elements in an $r^{th}$ row and a $(p=r+I)^{th}$ row of $W_2^k$ are applied to antennas in different polarization directions at a same location of the antenna array. Inflection points, in frequency domain, of elements in $W_2$ that are corresponding to antennas in different polarization directions at a same location may be the same or relatively close. Therefore, the terminal device further generates $M_1$ pieces of second precoding indication information. The first frequency domain indication information and the $M_1$ pieces of second precoding indication information are used to determine T second elements, a $k^{th}$ element in the T second elements is a factor of an element in the $p^{th}$ row and a $q^{th}$ column of $W_2^k$, $M_2 < T$, and R=2I. In this case, $1 \leq r \leq I$, I is a positive integer, and p=r+I. The terminal device sends the $M_1$ pieces of second precoding indication information. With reference to FIG. 7, an example in which a phase factor of $W_2^k$ is $z_{r,s}^k$ is used. It is assumed that, $W_2^k$ is a matrix with eight rows and two columns, r=2, s=1, and I=4. In this case, inflection points, in frequency domain, of a phase factor $W_2^k$ in a $2^{nd}$ row and a $1^{st}$ column of $W_2^k$ and a phase factor in a $6^{th}$ row and the $1^{st}$ column of $w_2^k$ are both indicated by the first frequency domain indication information. For example, the first frequency domain indication information indicates the frequency domain subbands numbered 0, 3, 8, and 12. After receiving the first frequency domain indication information and the $M_1$ pieces of second precoding indication information, the access network device may determine a phase factor in the $(r+I)^{th}$ row and the $q^{th}$ column of a precoding matrix $W_2^k$ of each of the T subbands based on the first frequency domain indication information and the $M_1$ pieces of second precoding indication information. Therefore, the first frequency domain indication information is used to indicate frequency domain positions corresponding to all the elements in the $r^{th}$ row and the $(r+I)^{th}$ row of $W_2^k$, so that feedback overheads can be reduced.

For how the terminal device generates the $M_1$ pieces of second precoding indication information, refer to the description about how the terminal device generates the $M_1$ pieces of first precoding indication information. Details are not described again. For how the terminal device determines the T second elements, refer to the method for determining the T first elements by the terminal device. Details are not described again. Likewise, for how the access network device determines the T second elements based on the first frequency domain indication information and the $M_1$ pieces of second precoding indication information, refer to the method for determining the T first elements based on the first frequency domain indication information and the $M_1$ pieces of first precoding indication information by the access network device. Details are not described again.

In an example, factors of at least two elements at different locations of $W_2^k$ have different frequency domain indications. The elements at different locations of $W_2^k$ are elements in different rows and/or different columns of $W_2^k$. In this example, the terminal device generates second frequency domain indication information and $M_2$ pieces of third precoding indication information. The second frequency domain indication information is used to indicate $L_2$ frequency domain subbands in the T frequency domain subbands, and $L_2 < T$. The second frequency domain indication information and the $M_2$ pieces of third precoding indication information are used to determine T third elements, a $k^{th}$ element in the T third elements is a factor of an element in a $u^{th}$ row and a $v^{th}$ column of $W_2^k$, and $1 < M_2 < T$. u is not equal to r, or v is not equal to s. $1 \le u \le R$ and $1 \le v \le S$. The terminal device sends the second frequency domain indication information and the $M_2$ pieces of third precoding indication information. In this example, the at least two elements at different locations of $W_2^k$ have different frequency domain indication information, which is the first frequency domain indication information and the second frequency domain indication information. PMI feedback precision is improved.

Based on the value ranges of $p_{r,s}^{(WB)}$ and $p_{r,s}^{(SB)}$ in formula (3) and formula (4), $p_{r,s}^{(WB)}$, corresponding to a largest wideband amplitude, in any column of $W_2^k$ is used as a relative reference point for other wideband amplitudes in this column. Therefore, precoding indication information (precoding indication information such as the first precoding indication information and the first precoding indication information) may not indicate a largest amplitude $p_{r,s}^{(WB)}$ in each column. The same is true of $p_{r,s}^{(SB)}$ and $z_{r,s}$. In other words, for elements indicated by precoding indication information, because an element at a reference point is usually a constant, the element may not be indicated. To improve feedback precision, elements at different locations of $W_2^k$ may have respective frequency domain indication information. For example, each piece of phase information $z_{r,s}$ has respective frequency domain indication information used to indicate a location of an inflection point of $z_{r,s}$. However, $z_{r,s}$ at a location of a reference point in each column does not need to be reported. In this way, feedback precision can be improved, and feedback overheads can be reduced. For how the terminal device generates the second frequency domain indication information and the $M_2$ pieces of third precoding indication information, refer to the description about how the terminal device generates the first frequency domain indication information and the $M_1$ pieces of first precoding indication information. Details are not described again. For how the terminal device determines the T third elements, refer to the method for determining the T first elements by the terminal device. Details are not described again. Likewise, for how the access network device determines the T third elements based on the second frequency domain indication information and the $M_2$ pieces of third precoding indication information, refer to the method for determining the T first elements based on the first frequency domain indication information and the $M_1$ pieces of first precoding indication information by the access network device. Details are not described again.

In an example, $R \ge 2$. In other words, $W_2^k$ has at least two columns. In this example, factors of at least two elements in a same row but different columns of $W_2^k$ have same frequency domain indication information. The terminal device generates $M_1$ pieces of fourth precoding indication information. The first frequency domain indication information and the $M_1$ pieces of fourth precoding indication information are used to determine T fourth elements, and a $k^{th}$ element in the T fourth elements is a factor of an element in the $r^{th}$ row and a $t^{th}$ column of $W_2^k$. t is not equal to s, $1 \le r \le R$, and $1 \le t \le S$. The terminal device sends the $M_1$ pieces of fourth precoding indication information. Elements in a same row but different columns of $W_2^k$ have same first frequency domain indication information, so that feedback overheads can be reduced. For how the terminal device generates the $M_1$ pieces of fourth precoding indication information, refer to the description about how the terminal device generates the $M_1$ pieces of first precoding indication information. Details are not described again. For how the terminal device determines the T fourth elements, refer to the method for determining the T first elements by the terminal device. Details are not described again. Likewise, for how the access network device determines the T fourth elements based on the first frequency domain indication information and the $M_1$ pieces of fourth precoding indication information, refer to the method for determining the T first elements based on the first frequency domain indication information and the $M_1$ pieces of first precoding indication information by the access network device. Details are not described again.

In an example, $R=2I$, $p=r+I$, u is not equal to r and is also not equal to r+I, q=s, and $1 \le v \le S$. The factor of the element in the $r^{th}$ row and the $s^{th}$ column of $W_2^k$ and the factor of the element in the $(r+I)^{th}$ row and the $s^{th}$ column of $W_2^k$ may share the first frequency domain indication information, while the factor of the element in the $u^{th}$ row and the $v^{th}$ column of $W_2^k$ uses the second frequency domain indication information. In this way, feedback overheads of the terminal device can be reduced, and feedback precision can be improved.

In an example, $R=2I$, $p=r+I$, u is not equal to r and is also not equal to r+I, $1 \le q \le S$, and $1 \le v \le S$. Factors of elements in the $r^{th}$ row and all columns of $W_2^k$ and factor of elements in the $(r+I)^{th}$ row and all columns of $W_2^k$ may share the first frequency domain indication information, while the factor of the element in the $u^{th}$ row and the $v^{th}$ column of $W_2^k$ uses the second frequency domain indication information. In this way, feedback overheads of the terminal device can be reduced, and feedback precision can be improved.

In an example, $c_{i,j}^k$ represents one of the following:
$c_{i,j}^k$ is a multiplication factor of $a_{i,j}^k$;
$c_{i,j}^k$ is a real part of a multiplication factor of $a_{i,j}^k$;
$c_{i,j}^k$ is an imaginary part of a multiplication factor of $a_{i,j}^k$;
$c_{i,j}^k$ represents an amplitude of $a_{i,j}^k$;
$c_{i,j}^k$ represents a phase of $a_{i,j}^k$;
$c_{i,j}^k$ represents an amplitude of a multiplication factor of $a_{i,j}^k$; and
$c_{i,j}^k$ represents a phase of a multiplication factor of $a_{i,j}^k$.

In an example, when i=r and j=s, the T first elements are $c_{i,j}^k$.

In an example, i=p=r+I, and j=q. The T second elements are $c_{i,j}^k$.

In an example, i=r, j=t, and t is not equal to s. The T fourth elements are $c_{i,j}^k$.

In an example, $a_{i,j}^k$ satisfies:

$$a_{i,j}^k = p_{i,j}^{(WB)} \cdot p_{i,j}^k \cdot z_{i,j}^k.$$

$p_{i,j}^{(WB)}$ represents a wideband amplitude and is a non-negative real number. $p_{i,j}^k$ represents a subband amplitude and is a non-negative real number. $z_{i,j}^k$ represents a phase, and $z_{r,s}^k$ is a complex number whose modulus is 1.

Optionally, $c_{i,j}^i$ represents one of the following:

$c_{i,j}^k$ is $p_{i,j}^k$;
$c_{i,j}^k$ is $p_{i,j}^{(WB)} \cdot p_{i,j}^k$;
$c_{i,j}^k$ is $z_{i,j}^k$;
$c_{i,j}^k$ is a real part of $z_{i,j}^k$;
$c_{i,j}^k$ is an imaginary part of $z_{i,j}^k$;
$c_{i,j}^k$ is $p_{i,j}^{(WB)} \cdot z_{i,j}^k$;
$c_{i,j}^k$ is a real part of $p_{i,j}^{(WB)} \cdot z_{i,j}^k$;
$c_{i,j}^k$ is an imaginary part of $p_{i,j}^{(WB)} \cdot z_{i,j}^k$;
$c_{i,j}^k$ is $p_{i,j}^k \cdot z_{i,j}^k$;
$c_{i,j}^k$ is a real part of $p_{i,j}^k \cdot z_{i,j}^k$; and
$c_{i,j}^k$ is an imaginary part of $p_{i,j}^k \cdot z_{i,j}^k$.

In an example, to indicate M subbands selected from N subbands and indicate locations (numbers) of the M frequency domain subbands in the N subbands, the first frequency domain indication information may be represented by i, and $$i = \sum_{m=0}^{M-1} C(N - 1 - n^{(m)}, M - m).$$

When first precoding indication information for a subband 0 is definitely to be reported, the first frequency domain indication information does not need to indicate the subband 0, and N=T-1. In this case, $n^{(m)}$ indicates a location index, minus 1, of an $m^{th}$ subband in locations of the selected M frequency domain subbands, and $n^{(m)} \in \{0, 1, \ldots T-2\}$. When first precoding indication information for a subband 0 and a subband T-1 is definitely to be reported, the terminal device does not need to feed back locations of the subband 0 and the subband T-1, and N=T-2. In this case, $n^{(m)}$ indicates a location index, minus 1, of an $m^{th}$ subband in locations of the selected M frequency domain subbands, and $n^{(m)} \in \{0, 1, \ldots T-3\}$. In another case, N=T, and $n^{(m)}$ indicates a location index of an $m^{th}$ subband in locations of the selected M frequency domain subbands.

$$C(x, y) = \frac{x \times (x-1) \times \ldots \times (x-y+1)}{y \times (y-1) \times \ldots \times 1}.$$

When frequency domain indication information is first indication information, $M=L_1$; or when frequency domain indication information is second indication information, $M=L_2$.

The foregoing embodiment is described by using an example in which the element $a_{r,s}^k$ in the $r^{th}$ row and the $s^{th}$ column of $W_2^k$ is equal to $p_{r,s}^{(WB)} \cdot p_{r,s}^k \cdot z_{r,s}^k$ and the factor of $a_{r,s}^k$ is a phase factor $z_{r,s}^k$. The factor of the element $a_{r,s}^k$ in the $r^{th}$ row and the $s^{th}$ column of $W_2^k$ may alternatively be $p_{r,s}^k$. The factor of the element $a_{r,s}^k$ in the $r^{th}$ row and the $s^{th}$ column of $W_2^k$ may alternatively be a product of any two of $p_{r,s}^{(WB)}$, $p_{r,s}^k$, and $z_{r,s}^k$. The factor of the element $a_{r,s}^k$ in the $r^{th}$ row and the $s^{th}$ column of $W_2^k$ may alternatively be $a_{r,s}^k$, or the like. Implementations of other factors are similar to the foregoing embodiment in which the factor is $z_{r,s}^k$. Details are not described again.

In an example, the terminal device obtains channel quality indicators (CQI) for the T frequency domain subbands. The CQIs for the T subbands are obtained based on the T precoding matrices corresponding to the T frequency domain subbands. To be specific, the terminal device assumes that a base station precodes downlink data on each of the T subbands by using a precoding matrix corresponding to the subband, and the terminal device derives a CQI based on this assumption. The terminal device sends the CQIs for the T frequency domain subbands to the access network device. Optionally, to reduce CQI feedback overheads of the terminal device, the terminal device may alternatively report some of the CQIs for the T frequency domain subbands.

For example, the terminal device generates fourth frequency domain indication information and $M_3$ CQIs. The T CQIs are in a one-to-one correspondence with the T frequency domain subbands. The fourth frequency domain indication information is used to indicate $L_3$ frequency domain subbands in the T frequency domain subbands, and $1 \leq L_3 < T$. The fourth frequency domain indication information and the $M_3$ CQIs are used to determine the T CQIs, and $1 < M_3 < T$.

The terminal device sends the fourth frequency domain indication information and the $M_3$ CQIs.

After receiving the $M_3$ CQIs sent by the terminal device, the access network device obtains the CQIs for all the T frequency domain subbands in an interpolation manner.

The sending action of the terminal device in step 502 may be implemented by the transceiver 301. When the communications apparatus in FIG. 4 is a terminal device or a chip of a terminal device, the sending action of the terminal device in this step may alternatively be implemented by the transceiver unit 401.

Correspondingly, the receiving action of the access network device may be implemented by the transceiver 301. When the communications apparatus in FIG. 4 is an access network device or a chip of a terminal device, the receiving action of the access network device may alternatively be implemented by the transceiver unit 401.

Figure 8:
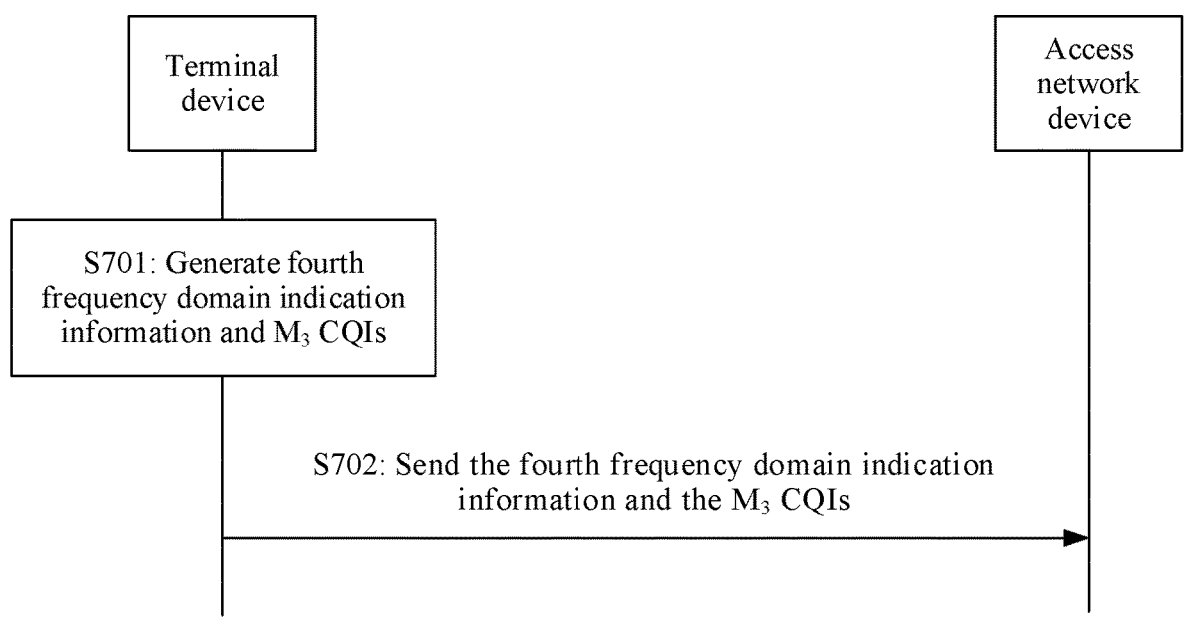
FIG. 8 is a schematic diagram of feeding back a CQI by a terminal device according to this application.

FIG. 8 is a schematic diagram of a method for sending a CQI by a terminal device according to this application.

Step 801: The terminal device generates fourth frequency domain indication information and $M_3$ CQIs. The T CQIs are in a one-to-one correspondence with T frequency domain subbands. The fourth frequency domain indication information is used to indicate $L_3$ frequency domain subbands in the T frequency domain subbands, and $L_3 < T$. The fourth frequency domain indication information and the $M_3$ CQIs are used to determine the T CQIs, and $1 < M_3 < T$.

This step may be implemented by the processor 300. When the communications apparatus in FIG. 4 is a terminal device or a chip of a terminal device, this step may alternatively be implemented by the processing unit 402.

This step may be implemented by the processor 300. When the communications apparatus in FIG. 4 is a terminal device or a chip of a terminal device, this step may alternatively be implemented by the processing unit 402.

Step 802: The terminal device sends the fourth frequency domain indication information and the $M_3$ CQIs. The sending action of the terminal device in this step may be implemented by the transceiver 301. When the communications apparatus in FIG. 4 is a terminal device or a chip of a terminal device, the sending action of the terminal device in this step may alternatively be implemented by the transceiver unit 401.

The access network device receives the fourth frequency domain indication information and the $M_3$ CQIs. The access network device determines the $L_3$ frequency domain subbands based on the fourth frequency domain indication information. The access network device obtains the T CQIs for the T frequency domain subbands based on the fourth frequency domain indication information and the $M_3$ CQIs. For a method for obtaining the T CQIs for the T frequency domain subbands based on the fourth frequency domain indication information and the $M_3$ CQIs by the access network device, refer to the method for determining the T first elements based on the first frequency domain indication information and the $M_1$ pieces of first precoding indication information by the access network device. Details are not described again.

When the access network device and the terminal device perform data transmission by using MIMO, the embodiment in FIG. 8 may be combined with the embodiment in FIG. 5.

When the access network device and the terminal device do not perform data transmission by using MIMO, the embodiment in FIG. 8 may also be combined with the embodiment in FIG. 5.

In the embodiments of the channel state information feedback methods, the terminal device does not need to feed back channel state information for all the T subbands, so that feedback overheads are reduced and system resource utilization is improved.

In the embodiments of this application, the first frequency domain indication information, the M1 pieces of first precoding indication information, the M2 pieces of second precoding indication information, the second frequency domain indication information, the M2 pieces of third precoding indication information, the M1 pieces of fourth precoding indication information, the fourth frequency domain indication information, and the M3 CQIs may be sent by the terminal device in one time unit or in different time units. This is not limited herein. When the foregoing information is not sent in one time unit, a sending sequence of the foregoing information is not limited either. One time unit may be one subframe, one slot, one or more time domain symbols, or the like. For example, one time domain symbol is an orthogonal frequency division multiplexing (OFDM) symbol.

This application further provides a computer storage medium. The computer-readable storage medium stores an instruction. When the instruction is run on a computer, the computer is enabled to perform the methods performed by the terminal device in the foregoing method embodiments.

This application further provides a computer storage medium. The computer-readable storage medium stores an instruction. When the instruction is run on a computer, the computer is enabled to perform the methods performed by the access network device in the foregoing method embodiments.

An embodiment of this application further provides a computer program product. The computer program product includes an instruction. When the computer program is executed by a computer, the instruction enables the computer to perform the functions performed by the terminal device in the foregoing methods.

An embodiment of this application further provides a computer program product. The computer program product includes an instruction. When the computer program is executed by a computer, the instruction enables the computer to perform the functions performed by the access network device in the foregoing methods.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the processes or functions according to the embodiments of the present invention are completely or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more available media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that in various embodiments of the present invention, sequence numbers of the foregoing processes do not mean execution sequences. The execution sequences of the processes should be determined based on functions and internal logic of the processes, and should not be construed as any limitation to the implementation processes of the embodiments of the present invention.

It may be clearly understood by a person skilled in the art that, for convenient and brief description, for a specific working process of the foregoing system, apparatus, and unit, refer to a corresponding process in the foregoing method embodiments. Details are not described herein.

The foregoing descriptions are merely specific implementations of the present invention, but are not intended to limit the protection scope of the present invention. Any variation or replacement readily figured out by the person skilled in the art within the technical scope disclosed in the present invention shall fall within the protection scope of the present invention.

What is claimed is:

1. A channel state information feedback method, comprising:
   generating first frequency domain indication information and $M_1$ pieces of first precoding indication information, wherein the first frequency domain indication information is used to indicate $L_1$ frequency domain subbands in T frequency domain subbands, the T frequency domain subbands are a system bandwidth or a part of a system bandwidth, $1 \leq L_1 < T$, the T frequency domain subbands are in a one-to-one correspondence with T precoding matrices, and a precoding matrix $w^k$ corresponding to a $k^{th}$ frequency domain subband satisfies:

$W^k = W_1 \times W_2^k$, wherein $w_1$ represents a matrix with $N_t$ rows and R columns, and $W_2^k$ represents a matrix with R rows and S columns; and the first frequency domain indication information and the $M_1$ pieces of first precoding indication information are used to determine T first elements, a $k^{th}$ first element in the T first elements is a factor of an element in an $r^{th}$ row and an $s^{th}$ column of $W_2^k$, and $1<M_1<T$; and sending the first frequency domain indication information and the $M_1$ pieces of first precoding indication information.

2. The method according to claim 1, further comprising:
generating $M_1$ pieces of second precoding indication information, wherein the first frequency domain indication information and the $M_1$ pieces of second precoding indication information are used to determine T second elements, a $k^{th}$ second element in the T second elements is a factor of an element in a $p^{th}$ row and a $q^{th}$ column of $W_2^k$, R=2I, $1 \le r \le I$, I is a positive integer, and p=r+I; and sending the $M_1$ pieces of second precoding indication information.

3. The method according to claim 1, further comprising:
generating second frequency domain indication information and $M_2$ pieces of third precoding indication information, wherein the second frequency domain indication information is used to indicate $L_2$ frequency domain subbands in the T frequency domain subbands, and $L_2<T$; and the second frequency domain indication information and the $M_2$ pieces of third precoding indication information are used to determine T third elements, a kth third element in the T third elements is a factor of an element in a $u^{th}$ row and a $v^{th}$ column of $W_2^k$, and $1<M_2<T$, wherein u is not equal to r, or v is not equal to s; and sending the second frequency domain indication information and the $M_2$ pieces of third precoding indication information.

4. The method according to claim 1, further comprising:
generating $M_1$ pieces of fourth precoding indication information, wherein $S \ge 2$, the first frequency domain indication information and the $M_1$ pieces of fourth precoding indication information are used to determine T fourth elements, a $k^{th}$ fourth element in the T fourth elements is a factor of an element in the $r^{th}$ row and a $t^{th}$ column of $W_2^k$, and t is not equal to s; and sending the $M_1$ pieces of fourth precoding indication information.

5. The method according to claim 1, further comprising:
determining $M_1$ frequency domain subbands in the T frequency domain subbands, wherein the $M_1$ frequency domain subbands comprise the $L_1$ frequency domain subbands, and $L_1 \le M_1$;

determining $M_1$ first elements that are in a one-to-one correspondence with the $M_1$ frequency domain subbands, wherein the T first elements comprise the $M_1$ first elements, and the generating first frequency domain indication information comprises:

generating the first frequency domain indication information based on the $L_1$ frequency domain subbands; and determining $T-M_1$ first elements in the T first elements except the $M_1$ first elements in an interpolation manner based on the $M_1$ frequency domain subbands and the $M_1$ first elements.

6. A channel state information receiving method, comprising:
receiving first frequency domain indication information and $M_1$ pieces of precoding indication information, wherein the first frequency domain indication information is used to indicate $L_1$ frequency domain subbands in T frequency domain subbands, the T frequency domain subbands are a system bandwidth or a part of a system bandwidth, $1 \le L_1 < T$, the T frequency domain subbands are in a one-to-one correspondence with T precoding matrices, and a precoding matrix $w^k$ corresponding to a $k^{th}$ frequency domain subband satisfies:

$$W^k = W_1 \times W_2^k, \text{ wherein}$$

$w_1$ represents a matrix with $N_t$ rows and R columns, and $W_2^k$ represents a matrix with R rows and S columns; and determining T first elements based on the first frequency domain indication information and the $M_1$ pieces of first precoding indication information, wherein a $k^{th}$ first element in the T first elements is a factor of an element in an $r^{th}$ row and an $s^{th}$ column of $W_2^k$ and $1<M_1<T$.

7. The method according to claim 6, further comprising:
receiving $M_1$ pieces of second precoding indication information; and determining T second elements based on the first frequency domain indication information and the $M_1$ pieces of second precoding indication information, wherein a $k^{th}$ second element in the T second elements is a factor of an element in a $p^{th}$ row and a $q^{th}$ column of $W_2^k$, R=2I, $1 \le r \le I$, I is a positive integer, and p=r+I.

8. The method according to claim 6, further comprising:
receiving second frequency domain indication information and $M_2$ pieces of third precoding indication information, wherein the second frequency domain indication information is used to indicate $L_2$ frequency domain subbands in the T frequency domain subbands, and $1 \le L_2 < T$; and determining T third elements based on the second frequency domain indication information and the $M_2$ pieces of third precoding indication information, wherein a $k^{th}$ third element in the T third elements is a factor of an element in a $u^{th}$ row and a $v^{th}$ column of $W_2^k$, and $1<M_2<T$, wherein u is not equal to r, or v is not equal to s.

9. The method according to claim 6, further comprising:
receiving $M_1$ pieces of fourth precoding indication information; and determining T fourth elements based on the first frequency domain indication information and the $M_1$ pieces of fourth precoding indication information, wherein $S \ge 2$, a $k^{th}$ fourth element in the T fourth elements is a factor of an element in the $r^{th}$ row and a $t^{th}$ column of $W_2^k$, and t is not equal to s.

10. The method according to claim 6, wherein the determining T first elements based on the first frequency domain indication information and the $M_1$ pieces of first precoding indication information comprises:

determining $M_1$ frequency domain subbands in the T frequency domain subbands based on the first frequency domain indication information, wherein the $M_1$ frequency domain subbands comprise the $L_1$ frequency domain subbands, and $L_1 \le M_1$;

determining $M_1$ first elements in the T first elements based on the $M_1$ pieces of first precoding indication information, wherein the $M_1$ frequency domain subbands are in a one-to-one correspondence with the $M_1$ first elements; and determining $T-M_1$ first elements in the T first elements except the $M_1$ first elements in an interpolation manner based on the first frequency domain indication information and the $M_1$ first elements.

11. A communications apparatus, comprising:
a processor, configured to generate first frequency domain indication information and $M_1$ pieces of first precoding indication information, wherein the first frequency domain indication information is used to indicate $L_i$ frequency domain subbands in T frequency domain subbands, the T frequency domain subbands are a system bandwidth or a part of a system bandwidth, $1 \le L_1 < T$, the T frequency domain subbands are in a one-to-one correspondence with T precoding matrices, and a precoding matrix $w^k$ corresponding to a $k^{th}$ frequency domain subband satisfies:

$W^k = W_1 \times W_2^k$, wherein $w_1$ represents a matrix with $N_t$ rows and R columns, and $W_2^k$ represents a matrix with R rows and S columns; and the first frequency domain indication information and the $M_1$ pieces of first precoding indication information are used to determine T first elements, a $k^{th}$ first element in the T first elements is a factor of an element in an $r^{th}$ row and an $s^{th}$ column of $W_2^k$, and $1 < M_1 < T$; and a transceiver, configured to send the first frequency domain indication information and the $M_1$ pieces of first precoding indication information.

12. The communications apparatus according to claim 11, wherein the processor is further configured to generate $M_1$ pieces of second precoding indication information, wherein the first frequency domain indication information and the $M_1$ pieces of second precoding indication information are used to determine T second elements, a $k^{th}$ second element in the T second elements is a factor of an element in a $p^{th}$ row and a $q^{th}$ column of $W_2^k$, $R=2I$, I is a positive integer, $1 \le r \le I$, and $p=r+I$; and the transceiver is further configured to send the $M_1$ pieces of second precoding indication information.

13. The communications apparatus according to claim 11, wherein the processor is further configured to generate second frequency domain indication information and $M_2$ pieces of third precoding indication information, wherein the second frequency domain indication information is used to indicate $L_2$ frequency domain subbands in the T frequency domain subbands, and $1 \le L_2 < T$; and the second frequency domain indication information and the $M_2$ pieces of third precoding indication information are used to determine T third elements, a $k^{th}$ third element in the T third elements is a factor of an element in a $u^{th}$ row and a $v^{th}$ column of $W_2^k$, and $1 < M_2 < T$, wherein u is not equal to r, or v is not equal to s; and the transceiver is further configured to send the second frequency domain indication information and the $M_2$ pieces of third precoding indication information.

14. The communications apparatus according to claim 11, wherein the processor is further configured to generate $M_1$ pieces of fourth precoding indication information, wherein $S \ge 2$, the first frequency domain indication information and the $M_1$ pieces of fourth precoding indication information are used to determine T fourth elements, a $k^{th}$ fourth element in the T fourth elements is a factor of an element in the $r^{th}$ row and a $t^{th}$ column of $W_2^k$, and t is not equal to s; and the transceiver is further configured to send the $M_1$ pieces of fourth precoding indication information.

15. The communications apparatus according to claim 11, wherein the processor is further configured to determine $M_1$ frequency domain subbands in the T frequency domain subbands, wherein the $M_1$ frequency domain subbands comprise the $L_1$ frequency domain subbands, and $L_1 \le M_1$;

the processor is further configured to determine $M_1$ first elements that are in a one-to-one correspondence with the $M_1$ frequency domain subbands, wherein the T first elements comprise the $M_1$ first elements;

the processor is configured to generate the first frequency domain indication information based on the $L_1$ frequency domain subbands; and the processor is further configured to determine $T-M_1$ first elements in the T first elements except the $M_1$ first elements in an interpolation manner based on the $M_1$ frequency domain subbands and the $M_1$ first elements.

16. A communications apparatus, comprising:
a transceiver, configured to receive first frequency domain indication information and $M_1$ pieces of precoding indication information, wherein the first frequency domain indication information is used to indicate $L_1$ frequency domain subbands in T frequency domain subbands, the T frequency domain subbands are a system bandwidth or a part of a system bandwidth, $L_1 < T$, the T frequency domain subbands are in a one-to-one correspondence with T precoding matrices, and a precoding matrix $w^k$ corresponding to a $k^{th}$ frequency domain subband satisfies:

$W^k = W_1 \times W_2^k$, wherein $w_1$ represents a matrix with $N_t$ rows and R columns, and $W_2^k$ represents a matrix with R rows and S columns; and a processor, configured to determine T first elements based on the first frequency domain indication information and the $M_1$ pieces of first precoding indication information, wherein a $k^{th}$ first element in the T first elements is a factor of an element in an $r^{th}$ row and an $s^{th}$ column of $W_2^k$, and $1 < M_1 < T$.

17. The communications apparatus according to claim 16, wherein the transceiver is further configured to receive $M_1$ pieces of second precoding indication information; and the processor is further configured to determine T second elements based on the first frequency domain indication information and the $M_1$ pieces of second precoding indication information, wherein a $k^{th}$ second element in the T second elements is a factor of an element in a $p^{th}$ row and a $q^{th}$ column of $W_2^k$, $R=2I$, I is a positive integer, $1 \le r \le I$, and $p=r+I$.

18. The communications apparatus according to claim 16, wherein the transceiver is further configured to receive second frequency domain indication information and $M_2$ pieces of third precoding indication information, wherein the third frequency domain indication information is used to indicate $L_2$ frequency domain subbands in the T frequency domain subbands, and $1 < L_2 < T$; and the processor is further configured to determine T third elements based on the second frequency domain indication information and the $M_2$ pieces of third precoding indication information, wherein a $k^{th}$ third element in the T third elements is a factor of an element in a $u^{th}$ row and a $v^{th}$ column of $W_2^k$, and $1 < M_2 < T$, wherein u is not equal to r, or v is not equal to s.

19. The communications apparatus according to claim 16, wherein the transceiver is further configured to receive $M_1$ pieces of fourth precoding indication information; and the processor is further configured to determine T fourth elements based on the first frequency domain indication information and the $M_1$ pieces of fourth precoding indication information, wherein $S \ge 2$, a $k^{th}$ fourth element in the T fourth elements is a factor of an element in the $r^{th}$ row and a $t^{th}$ column of $W_2^k$, and t is not equal to s.

20. The communications apparatus according to claim 16, wherein the processor is configured to determine $M_1$ frequency domain subbands in the T frequency domain subbands based on the first frequency domain indication information, wherein the $M_1$ frequency domain subbands comprise the $L_1$ frequency domain subbands, and $L_1 \leq M_1$;

the processor is configured to determine $M_1$ first elements in the T first elements based on the $M_1$ pieces of first precoding indication information, wherein the $M_1$ frequency domain subbands are in a one-to-one correspondence with the $M_1$ first elements; and the processor is configured to determine $T-M_1$ first elements in the T first elements except the $M_1$ first elements in an interpolation manner based on the first frequency domain indication information and the $M_1$ first elements.

* * * * *

UNITED STATES PATENT AND TRADEMARK OFFICE
CERTIFICATE OF CORRECTION

| | |
|---|---|
| PATENT NO. | : 10,855,358 B2 |
| APPLICATION NO. | : 15/931749 |
| DATED | : December 1, 2020 |
| INVENTOR(S) | : Ruiqi Zhang, Kunpeng Liu and Xueru Li |

It is certified that error appears in the above-identified patent and that said Letters Patent is hereby corrected as shown below:

In the Claims

Column 29, Line 5, Claim 11 delete "Li" and insert --L1-- therefore

Column 30, Line 53, Claim 18 delete "1<L2" and insert --$1 \leq L2$-- therefore

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*